(12) United States Patent
Gulick et al.

(10) Patent No.: US 6,263,385 B1
(45) Date of Patent: Jul. 17, 2001

(54) PC PARALLEL PORT STRUCTURE PARTITIONED BETWEEN TWO INTEGRATED CIRCUITS INTERCONNECTED BY A SERIAL BUS

(75) Inventors: Dale E. Gulick; David Neal Suggs, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/955,327

(22) Filed: Oct. 20, 1997

(51) Int. Cl.[7] .................................................. G06F 13/00

(52) U.S. Cl. .............................. 710/101; 710/8; 710/11; 710/12; 710/62; 710/63; 710/128; 710/129

(58) Field of Search ................................... 710/101, 128, 710/129, 8, 11, 12, 62, 63

(56) References Cited

U.S. PATENT DOCUMENTS

| | | | |
|---|---|---|---|
| 4,683,530 | 7/1987 | Quatse | 364/200 |
| 5,410,542 | 4/1995 | Gerbehy et al. | 370/85.1 |
| 5,457,785 | * 10/1995 | Kikinis et al. | 710/128 |
| 5,566,306 | 10/1996 | Ishida | 395/309 |
| 5,727,171 | * 3/1998 | Iachetta, Jr. | 395/287 |
| 5,740,387 | 4/1998 | Lambrecht et al. | 395/309 |
| 5,754,828 | 5/1998 | Adan et al. | 395/500 |
| 5,765,186 | * 6/1998 | Searby | 711/100 |
| 5,816,921 | 10/1998 | Hosokawa | 463/43 |
| 5,819,034 | 10/1998 | Joseph et al. | 395/200.31 |
| 5,822,550 | * 10/1998 | Milhaupt et al. | 710/126 |
| 5,926,629 | * 7/1999 | Gulick | 395/297 |
| 6,012,111 | * 1/2000 | Gulick | 710/62 |
| 6,032,213 | * 2/2000 | Gulick | 710/129 |
| 6,058,443 | * 5/2000 | Gulick | 710/101 |

OTHER PUBLICATIONS

Startech, "ECP/EPP Parallel Port with 16 Byte FIFO," Jun. 17, 1996, pp. 4–23 through 4–48.

Rosch, W., "The Winn L. Rosch Hardware Bible, Third Edition," Sams Publishing, Indianapolis, IN, 1994, pp. 644–664.

Advanced Micro Devices, "Am7968/Am7969 TAXIchip™ Article Reprints," 1987, pp. 1–77.

National Semiconductor Corp., "Common Architecture: Desktop PC/AT systems," Version .93, Mar. 21, 1996, pp. 1–26.

(List continued on next page.)

*Primary Examiner*—Rupal Dharia
(74) *Attorney, Agent, or Firm*—Zagorin, O'Brien & Graham, LLP

(57) ABSTRACT

A first and second integrated circuit contain respectively a first and second portion of a parallel port, the first portion includes control, configuration, data and status registers and the second portion includes parallel port input and output terminals. A bus couples the first and second integrated circuits and transfers parallel port control and data information between the first and second integrated circuits. The bus includes a clock line providing a clock signal. The bus also includes a data out line that serially transfers output control and data bits from the first to the second integrated circuit, the data and control bits to be provided to the parallel port output terminals on the second integrated circuit. The bus also includes a data in line providing input data and control information from the terminals of the parallel port to the first integrated circuit. The bus provides data either substantially continuously in frames defined by a frame sync or uses a start bit to go from an idle state to a data transfer state according to the read and write operations of the parallel port. The mode of operation of the parallel port determines whether data is transferred continuously in frames or after a start bit.

29 Claims, 23 Drawing Sheets

OTHER PUBLICATIONS

National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface," Nov. 1995, pp. 1–110.

Intel, "82371FB (PIIX) and 82371SB (PIIX3) PCI ISA IDE Xcelerator," May 1996, pp. 1–118.

IEEE Std1284–1994, "IEEE Standard Signaling Method for a Bidirectional Parallel Peripheral Interface for Personal Computers," Dec. 2, 1994, pp. 1–100.

U.S. application No. 08/802,321, filed Feb. 18, 1997, entitled "System for Partitioning PC Chipset Functions into Logic and Port Integrated Circuits," by Dale E. Gulick (copy not enclosed).

U.S. application No. 08/802,323, filed Feb. 18, 1997, entitled "PC Chipset Interconnection Bus," by Dale E. Gulick (copy not enclosed).

U.S. application No. 08/866,644, filed May 30, 1997, entitiled "PC Chipset with Integrated Clock Synthesizer," by Dale E. Gulick (copy not enclosed).

U.S. application No. 08/866,652, filed May 30, 1997, entitled "Partitioned PC Game Port," by Dale E. Gulick (copy not enclosed).

* cited by examiner

| Bit# | TRANSMIT TO PEC Function |
|---|---|
| 0 | Command Valid |
| 1 | Link command bit 0 |
| 2 | bit 1 |
| 3 | bit 2 |
| 4 | bit 3 |
| 5 | bit 4 |
| 6 | bit 5 |
| 7 | bit 6 |
| 8 | Link command bit 7 |
| 9 | Reserved |
| 10 | Reserved |
| 11 | Reserved |
| 12 | Reserved |
| 13 | Reserved |
| 14 | Reserved |
| 15 | Reserved |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |
| 32 | Floppy WGATE/ |
| 33 | Floppy HDSEL/ |
| 34 | Floppy DIR/ |
| 35 | Floppy STEP/ |
| 36 | Floppy MTR0/ |
| 37 | Floppy MTR1/ |
| 38 | Floppy DR0/ |
| 39 | Floppy DR1/ |
| 40 | Floppy DENSEL |
| 41 | Floppy DRATE0 |
| 42 | Floppy DRATE1 |
| 43 | Reserved |
| 44 | Reserved |
| 45 | Reserved |
| 46 | Reserved |
| 47 | Reserved |

| Bit# | TRANSMIT TO PEC Function |
|---|---|
| 48 | Serial port 0 RTS/ |
| 49 | Serial port 0 DTR/ |
| 50 | Serial port TD |
| 51 | Reserved |
| 52 | Reserved |
| 53 | Serial port 1 RTS/ (or kybd tx) |
| 54 | Serial port 1 DTR/(or IrDA or mouse) |
| 55 | Serial port 1 TD (or IrDA or mouse) |
| 56 | Reserved (or IrDA or mouse) |
| 57 | Reserved (or IrDA or mouse) |
| 58 | Reserved |
| 59 | Reserved |
| 60 | Reserved |
| 61 | Reserved |
| 62 | Reserved |
| 63 | Reserved |
| 64 | Reserved |
| 65 | Game X0 request |
| 66 | Game X1 request |
| 67 | Game Y0 request |
| 68 | Game Y1 request |
| 69 | Reserved |
| 70 | Reserved |
| 71 | Reserved |
| 72 | Reserved |
| 73 | Reserved |
| 74 | Reserved |
| 75 | Reserved |
| 76 | Reserved |
| 77 | Reserved |
| 78 | Reserved |
| 79 | Reserved |
| 80 | Reserved |
| 81 | Reserved |
| 82 | PC speaker out |
| 83 | MIDI TX |
| 84 | User interface out |
| 85 | User interface out |
| 86 | User interface out |
| 87 | User interface out |
| 88 | User interface out |
| 89 | User interface out |
| 90 | User interface out |
| 91 | User interface out |
| 92 | User interface out |
| 93 | User interface out |
| 94 | User interface out |
| 95 | User interface out |

FIG. 8A

| Bit# | TRANSMIT FROM PEC Function | Bit# | TRANSMIT FROM PEC Function |
|---|---|---|---|
| 0 | Response/status | 48 | Serial port 0 CTS/ |
| 1 | Link status bit 0 | 49 | Serial port 0 DSR/ |
| 2 | bit 1 | 50 | Serial port 0 DCD/ |
| 3 | bit 2 | 51 | Serial port 0 RI |
| 4 | bit 3 | 52 | Serial port 0 RD |
| 5 | bit 4 | 53 | Serial port 1 CTS/(or kybd rx) |
| 6 | bit 5 | 54 | Serial port 1 DSR/(or IrDA or mouse) |
| 7 | bit 6 | 55 | Serial port 1 DCD/(or IrDA or mouse) |
| 8 | Link status bit 7 | 56 | Serial port 1 RI (or IrDA or mouse) |
| 9 | Reserved | 57 | Serial port 1 RD (or IrDA or mouse) |
| 10 | Reserved | 58 | Reserved |
| 11 | Reserved | 59 | Reserved |
| 12 | Reserved | 60 | Reserved |
| 13 | Reserved | 61 | Reserved |
| 14 | Reserved | 62 | Reserved |
| 15 | Reserved | 63 | Reserved |
| 16 | Reserved | 64 | Reserved |
| 17 | Reserved | 65 | Game X0 done |
| 18 | Reserved | 66 | Game X1 done |
| 19 | Reserved | 67 | Game Y0 done |
| 20 | Reserved | 68 | Game Y1 done |
| 21 | Reserved | 69 | Button 0 |
| 22 | Reserved | 70 | Button 1 |
| 23 | Reserved | 71 | Button 2 |
| 24 | Reserved | 72 | Button 3 |
| 25 | Reserved | 73 | Reserved |
| 26 | Reserved | 74 | Reserved |
| 27 | Reserved | 75 | Reserved |
| 28 | Reserved | 76 | Reserved |
| 29 | Reserved | 77 | Reserved |
| 30 | Reserved | 78 | Reserved |
| 31 | Reserved | 79 | Reserved |
| 32 | Floppy TRK0/ | 80 | Reserved |
| 33 | Floppy INDEX/ | 81 | Reserved |
| 34 | Floppy DSKCHG/ | 82 | Reserved |
| 35 | Floppy WP/ | 83 | MIDI RX |
| 36 | Reserved | 84 | Vol + |
| 37 | Reserved | 85 | Vol − |
| 38 | Reserved | 86 | Mute |
| 39 | Reserved | 87 | Keylock |
| 40 | Reserved | 88 | Turbo |
| 41 | Reserved | 89 | Setup disable |
| 42 | Reserved | 90 | CLR CMOS |
| 43 | Reserved | 91 | Sw 0 |
| 44 | Reserved | 92 | SW1 |
| 45 | Reserved | 93 | SW2 |
| 46 | Reserved | 94 | SW3 |
| 47 | Reserved | 95 | User interface in |

FIG. 8B

Standard/ PS2 Mode Bit Assignments

| Bit# | TRANSMIT TO PEC Function |
|---|---|
| 0 | Printer port data field 0 valid bit |
| 1 | Reserved |
| 2 | Printer port TX data field 0 bit 0 |
| 3 | bit 1 |
| 4 | bit 2 |
| 5 | bit 3 |
| 6 | bit 4 |
| 7 | bit 5 |
| 8 | bit 6 |
| 9 | Printer port data field 0 bit 7 |
| 10 | Printer port STB/ |
| 11 | Printer port PDIR |
| 12 | Printer port INIT/ |
| 13 | Printer port AFD/ |
| 14 | Printer port SLIN/ |
| 15 | Reserved |
| 16 | Printer port data field 1 valid bit |
| 17 | Reserved |
| 18 | Printer port TX data field 1 bit 0 |
| 19 | bit 1 |
| 20 | bit 2 |
| 21 | bit 3 |
| 22 | bit 4 |
| 23 | bit 5 |
| 24 | bit 6 |
| 25 | Printer port data field 1 bit 7 |
| 26 | Printer port STB/ |
| 27 | Printer port PDIR |
| 28 | Printer port INIT/ |
| 29 | Printer port AFD/ |
| 30 | Printer port SLIN/ |
| 31 | Reserved |
| 32 | Printer port data field 2 valid bit |
| 33 | Reserved |
| 34 | Printer port TX data field 2 bit 0 |
| 35 | bit 1 |
| 36 | bit 2 |
| 37 | bit 3 |
| 38 | bit 4 |
| 39 | bit 5 |
| 40 | bit 6 |
| 41 | Printer port data field 2 bit 7 |
| 42 | Printer port STB/ |
| 43 | Printer port PDIR |
| 44 | Printer port INIT/ |
| 45 | Printer port AFD/ |
| 46 | Printer port SLIN/ |
| 47 | Reserved |

| Bit# | TRANSMIT TO PEC Function |
|---|---|
| 48 | Printer port data field 3 valid bit |
| 49 | Reserved |
| 50 | Printer port TX data field 3 bit 0 |
| 51 | bit 1 |
| 52 | bit 2 |
| 53 | bit 3 |
| 54 | bit 4 |
| 55 | bit 5 |
| 56 | bit 6 |
| 57 | Printer port data field 3 bit 7 |
| 58 | Printer port STB/ |
| 59 | Printer port PDIR |
| 60 | Printer port INIT/ |
| 61 | Printer port AFD/ |
| 62 | Printer port SLIN/ |
| 63 | Reserved |
| 64 | Printer port data field 4 valid bit |
| 65 | Reserved |
| 66 | Printer port TX data field 4 bit 0 |
| 67 | bit 1 |
| 68 | bit 2 |
| 69 | bit 3 |
| 70 | bit 4 |
| 71 | bit 5 |
| 72 | bit 6 |
| 73 | Printer port data field 4 bit 7 |
| 74 | Printer port STB/ |
| 75 | Printer port PDIR |
| 76 | Printer port INIT/ |
| 77 | Printer port AFD/ |
| 78 | Printer port SLIN/ |
| 79 | Reserved |
| 80 | Printer port data field 5 valid bit |
| 81 | Reserved |
| 82 | Printer port TX data field 5 bit 0 |
| 83 | bit 1 |
| 84 | bit 2 |
| 85 | bit 3 |
| 86 | bit 4 |
| 87 | bit 5 |
| 88 | bit 6 |
| 89 | Printer port data field 5 bit 7 |
| 90 | Printer port STB/ |
| 91 | Printer port PDIR |
| 92 | Printer port INIT/ |
| 93 | Printer port AFD/ |
| 94 | Printer port SLIN/ |
| 95 | Reserved |

FIG. 12A

Standard/ PS2 Mode Bit Assignments

| Bit# | TRANSMIT FROM PEC Function | Bit# | TRANSMIT FROM PEC Function |
|---|---|---|---|
| 0 | Printer port data field 0 valid bit | 48 | Printer port data field 3 valid bit |
| 1 | Reserved | 49 | Reserved |
| 2 | Printer port RX data field 0 bit 0 | 50 | Printer port RX data field 3 bit 0 |
| 3 | bit 1 | 51 | bit 1 |
| 4 | bit 2 | 52 | bit 2 |
| 5 | bit 3 | 53 | bit 3 |
| 6 | bit 4 | 54 | bit 4 |
| 7 | bit 5 | 55 | bit 5 |
| 8 | bit 6 | 56 | bit 6 |
| 9 | Printer port data field 0 bit 7 | 57 | Printer port data field 3 bit 7 |
| 10 | Printer port Busy | 58 | Printer port Busy |
| 11 | Printer port ACK/ | 59 | Printer port ACK/ |
| 12 | Printer port PE | 60 | Printer port PE |
| 13 | Printer port SLCT | 61 | Printer port SLCT |
| 14 | Printer port ERR/ | 62 | Printer port ERR/ |
| 15 | Reserved | 63 | Reserved |
| 16 | Printer port data field 1 valid bit | 64 | Printer port data field 4 valid bit |
| 17 | Reserved | 65 | Reserved |
| 18 | Printer port RX data field 1 bit 0 | 66 | Printer port RX data field 4 bit 0 |
| 19 | bit 1 | 67 | bit 1 |
| 20 | bit 2 | 68 | bit 2 |
| 21 | bit 3 | 69 | bit 3 |
| 22 | bit 4 | 70 | bit 4 |
| 23 | bit 5 | 71 | bit 5 |
| 24 | bit 6 | 72 | bit 6 |
| 25 | Printer port data field 1 bit 7 | 73 | Printer port data field 4 bit 7 |
| 26 | Printer port Busy | 74 | Printer port Busy |
| 27 | Printer port ACK/ | 75 | Printer port ACK/ |
| 28 | Printer port PE | 76 | Printer port PE |
| 29 | Printer port SLCT | 77 | Printer port SLCT |
| 30 | Printer port ERR/ | 78 | Printer port ERR/ |
| 31 | Reserved | 79 | Reserved |
| 32 | Printer port data field 2 valid bit | 80 | Printer port data field 5 valid bit |
| 33 | Reserved | 81 | Reserved |
| 34 | Printer port RX data field 2 bit 0 | 82 | Printer port RX data field 5 bit 0 |
| 35 | bit 1 | 83 | bit 1 |
| 36 | bit 2 | 84 | bit 2 |
| 37 | bit 3 | 85 | bit 3 |
| 38 | bit 4 | 86 | bit 4 |
| 39 | bit 5 | 87 | bit 5 |
| 40 | bit 6 | 88 | bit 6 |
| 41 | Printer port data field 2 bit 7 | 89 | Printer port data field 5 bit 7 |
| 42 | Printer port Busy | 90 | Printer port Busy |
| 43 | Printer port ACK/ | 91 | Printer port ACK/ |
| 44 | Printer port PE | 92 | Printer port PE |
| 45 | Printer port SLCT | 93 | Printer port SLCT |
| 46 | Printer port ERR/ | 94 | Printer port ERR/ |
| 47 | Reserved | 95 | Reserved |

FIG. 12B

PS2 Read

ECP mode bit assignments

| Bit# | TRANSMIT TO PEC Function |
|---|---|
| 0 | Printer port data field 0 valid bit |
| 1 | Printer port data field 0 Data-CMD bit |
| 2 | Printer port TX data field 0 bit 0 |
| 3 | bit 1 |
| 4 | bit 2 |
| 5 | bit 3 |
| 6 | bit 4 |
| 7 | bit 5 |
| 8 | bit 6 |
| 9 | Printer port data field 0 bit 7 |
| 10 | Reserved |
| 11 | Reserved |
| 12 | Printer port INIT/ |
| 13 | Printer port AFD/ |
| 14 | Printer port SLIN/ |
| 15 | Reserved |
| 16 | Printer port data field 1 valid bit |
| 17 | Printer port data field 1 Data-CMD bit |
| 18 | Printer port TX data field 1 bit 0 |
| 19 | bit 1 |
| 20 | bit 2 |
| 21 | bit 3 |
| 22 | bit 4 |
| 23 | bit 5 |
| 24 | bit 6 |
| 25 | Printer port data field 1 bit 7 |
| 26 | Reserved |
| 27 | Reserved |
| 28 | Printer port INIT/ |
| 29 | Printer port AFD/ |
| 30 | Printer port SLIN/ |
| 31 | Reserved |
| 32 | Printer port data field 2 valid bit |
| 33 | Printer port data field 2 Data-CMD bit |
| 34 | Printer port TX data field 2 bit 0 |
| 35 | bit 1 |
| 36 | bit 2 |
| 37 | bit 3 |
| 38 | bit 4 |
| 39 | bit 5 |
| 40 | bit 6 |
| 41 | Printer port data field 2 bit 7 |
| 42 | Printer port STB/ |
| 43 | Printer port PDIR |
| 44 | Printer port INIT/ |
| 45 | Printer port AFD/ |
| 46 | Printer port SLIN/ |
| 47 | Reserved |

| Bit# | TRANSMIT TO PEC Function |
|---|---|
| 48 | Printer port data field 3 valid bit |
| 49 | Printer port data field 3 Data-CMD bit |
| 50 | Printer port TX data field 3 bit 0 |
| 51 | bit 1 |
| 52 | bit 2 |
| 53 | bit 3 |
| 54 | bit 4 |
| 55 | bit 5 |
| 56 | bit 6 |
| 57 | Printer port data field 3 bit 7 |
| 58 | Reserved |
| 59 | Reserved |
| 60 | Printer port INIT/ |
| 61 | Printer port AFD/ |
| 62 | Printer port SLIN/ |
| 63 | Reserved |
| 64 | Printer port data field 4 valid bit |
| 65 | Printer port data field 4 Data-CMD bit |
| 66 | Printer port TX data field 4 bit 0 |
| 67 | bit 1 |
| 68 | bit 2 |
| 69 | bit 3 |
| 70 | bit 4 |
| 71 | bit 5 |
| 72 | bit 6 |
| 73 | Printer port data field 4 bit 7 |
| 74 | Reserved |
| 75 | Reserved |
| 76 | Printer port INIT/ |
| 77 | Printer port AFD/ |
| 78 | Printer port SLIN/ |
| 79 | Reserved |
| 80 | Printer port data field 5 valid bit |
| 81 | Printer port data field 5 Data-CMD bit |
| 82 | Printer port TX data field 5 bit 0 |
| 83 | bit 1 |
| 84 | bit 2 |
| 85 | bit 3 |
| 86 | bit 4 |
| 87 | bit 5 |
| 88 | bit 6 |
| 89 | Printer port data field 5 bit 7 |
| 90 | Reserved |
| 91 | Reserved |
| 92 | Printer port INIT/ |
| 93 | Printer port AFD/ |
| 94 | Printer port SLIN/ |
| 95 | Reserved |

FIG. 16A

ECP mode bit assignments

| Bit# | RECEIVE FROM PEC Function |
|---|---|
| 0 | Printer port data field 0 valid bit |
| 1 | Printer port data field 0 RLE bit |
| 2 | Printer port RX data field 0 bit 0 |
| 3 | bit 1 |
| 4 | bit 2 |
| 5 | bit 3 |
| 6 | bit 4 |
| 7 | bit 5 |
| 8 | bit 6 |
| 9 | Printer port data field 0 bit 7 |
| 10 | Reserved |
| 11 | Reserved |
| 12 | Printer port PE |
| 13 | Printer port SLCT |
| 14 | Printer port ERR/ |
| 15 | Reserved |
| 16 | Printer port data field 1 valid bit |
| 17 | Printer port data field 1 RLE bit |
| 18 | Printer port RX data field 1 bit 0 |
| 19 | bit 1 |
| 20 | bit 2 |
| 21 | bit 3 |
| 22 | bit 4 |
| 23 | bit 5 |
| 24 | bit 6 |
| 25 | Printer port data field 1 bit 7 |
| 26 | Reserved |
| 27 | Reserved |
| 28 | Printer port PE |
| 29 | Printer port SLCT |
| 30 | Printer port ERR/ |
| 31 | Reserved |
| 32 | Printer port data field 2 valid bit |
| 33 | Printer port data field 2 RLE bit |
| 34 | Printer port RX data field 2 bit 0 |
| 35 | bit 1 |
| 36 | bit 2 |
| 37 | bit 3 |
| 38 | bit 4 |
| 39 | bit 5 |
| 40 | bit 6 |
| 41 | Printer port data field 2 bit 7 |
| 42 | Printer port Busy |
| 43 | Printer port ACK/ |
| 44 | Printer port PE |
| 45 | Printer port SLCT |
| 46 | Printer port ERR/ |
| 47 | Reserved |

| Bit# | RECEIVE FROM PEC Function |
|---|---|
| 48 | Printer port data field 3 valid bit |
| 49 | Printer port data field 3 RLE bit |
| 50 | Printer port RX data field 3 bit 0 |
| 51 | bit 1 |
| 52 | bit 2 |
| 53 | bit 3 |
| 54 | bit 4 |
| 55 | bit 5 |
| 56 | bit 6 |
| 57 | Printer port data field 3 bit 7 |
| 58 | Reserved |
| 59 | Reserved |
| 60 | Printer port PE |
| 61 | Printer port SLCT |
| 62 | Printer port ERR/ |
| 63 | Reserved |
| 64 | Printer port data field 4 valid bit |
| 65 | Printer port data field 4 RLE bit |
| 66 | Printer port RX data field 4 bit 0 |
| 67 | bit 1 |
| 68 | bit 2 |
| 69 | bit 3 |
| 70 | bit 4 |
| 71 | bit 5 |
| 72 | bit 6 |
| 73 | Printer port data field 4 bit 7 |
| 74 | Reserved |
| 75 | Reserved |
| 76 | Printer port PE |
| 77 | Printer port SLCT |
| 78 | Printer port ERR/ |
| 79 | Reserved |
| 80 | Printer port data field 5 valid bit |
| 81 | Printer port data field 5 RLE bit |
| 82 | Printer port RX data field 5 bit 0 |
| 83 | bit 1 |
| 84 | bit 2 |
| 85 | bit 3 |
| 86 | bit 4 |
| 87 | bit 5 |
| 88 | bit 6 |
| 89 | Printer port data field 5 bit 7 |
| 90 | Reserved |
| 91 | Reserved |
| 92 | Printer port PE |
| 93 | Printer port SLCT |
| 94 | Printer port ERR/ |
| 95 | Reserved |

FIG. 16B

EPP WRITE mode bit assignments

| | TRANSMIT TO PEC |
|---|---|
| Bit# | Function |
| 0 | Start-Bit (=1) |
| 1 | Read-Write bit (0=write, 1=read) |
| 2 | Address-Data bit (0=data,1=address) |
| 3 | Printer port TX data bit 0 |
| 4 | bit 1 |
| 5 | bit 2 |
| 6 | bit 3 |
| 7 | bit 4 |
| 8 | bit 5 |
| 9 | bit 6 |
| 10 | Printer port TX data bit 7 |
| 11 | 0 |
| 12 | 0 |
| 13 | 0 |
| 14 | 0 |
| 15 | 0 |
| . | . . . . . |
| N | 0 |

| | RECEIVE FROM PEC |
|---|---|
| Bit# | Function |
| 0 | 0 |
| 1 | Busy pin state |
| 2 | Busy pin state |
| 3 | Busy pin state |
| 4 | Busy pin state |
| 5 | Busy pin state |
| 6 | Busy pin state |
| 7 | Busy pin state |
| 8 | Busy pin state |
| 9 | Busy pin state |
| 10 | Busy pin state |
| 11 | Busy pin state |
| 12 | Busy pin state |
| 13 | Busy pin state |
| 14 | Busy pin state |
| 15 | Busy pin state |
| . | . . . . . |
| N | Busy pin state Low |

FIG. 20A

EPP READ mode bit assignments

| | TRANSMIT TO PEC |
|---|---|
| Bit# | Function |
| 0 | Start-Bit (=1) |
| 1 | Read-Write bit (0=write, 1=read) |
| 2 | Address-Data bit (0=data,1=address) |
| 3 | 0 |
| . | . . . . . |
| N | 0 |
| N+1 | 0 |
| N+2 | 0 |
| N+3 | 0 |
| N+4 | 0 |
| N+5 | 0 |
| N+6 | 0 |
| N+7 | 0 |
| N+8 | 0 |

| | RECEIVE FROM PEC |
|---|---|
| Bit# | Function |
| 0 | 0 |
| 1 | 0 |
| 2 | 0 |
| 3 | 0 |
| . | . . . . . |
| N | Start Bit (1) |
| N+1 | Printer port RX data bit 0 |
| N+2 | bit 1 |
| N+3 | bit 2 |
| N+4 | bit 3 |
| N+5 | bit 4 |
| N+6 | bit 5 |
| N+7 | bit 6 |
| N+8 | Printer port RX data bit 7 |

FIG. 20B

EPP Write Data

EPP Write Addr

EPP Read Address

EPP Read Data

PC PARALLEL PORT STRUCTURE PARTITIONED BETWEEN TWO INTEGRATED CIRCUITS INTERCONNECTED BY A SERIAL BUS

BACKGROUND OF THE INVENTION

1. Field of the Invention

The present invention relates to computer systems, and, more particularly, to the partitioning of a parallel port among integrated circuits.

2. Description of the Related Art

A typical personal computer (PC) system includes a microprocessor, associated memory and control logic and a number of peripheral devices that provide input and output for the system. Such peripheral devices typically include a display monitor, a keyboard and mouse, a floppy disk drive, a hard disk drive and a printer. The number of devices being added to personal computer systems continues to grow. For example, many computer systems also include modems, sound devices, and CD-ROM drives.

PC systems use one of several expansion bus architectures to facilitate communication between various components of the system and to provide the versatility needed to add additional components to the system. For example, Industry Standard Architecture (ISA) provides an expansion bus for the 16-bit IBM AT personal computer. The Enhanced ISA (EISA) provide specifications for systems utilizing 32-bit microprocessors such as the Intel 80386 and 80486 microprocessors. The Peripheral Component Interconnect (PCI) bus provides a bus architecture for 32-bit or 64-bit interconnection systems independent of processor generation or family.

The ISA bus, originally called the Advanced Technology (AT) bus, added the functionality needed for full 16-bit technology, but maintained compatibility with an older 8-bit PC bus. Because of its initial speed and data-path match with the 80286 microprocessor, the original ISA bus substantially out-performed the PC bus. The ISA bus has resisted replacement by newer bus architectures such as EISA and Microchannel, and remains commonplace in personal computer systems in use today. This is true in part because many devices that are designed to interface with the ISA bus are in widespread use today. Such devices typically do not require the higher speed provided by the newer buses. Such devices are known as legacy devices since their design is based on older PC technology. Examples of such slower legacy devices include keyboards, and mouse(s), game ports, and floppy drives, modems and printers connected respectively to serial and parallel communication ports, direct memory access (DMA) controllers, interrupt controllers and timers. Those legacy devices do not need the high speed throughput of the newer generation of buses such as EISA, Microchannel Architecture (MCA) and the Peripheral Component Interface (PCI) bus.

Although personal computer system speeds have increased dramatically, the speed of the ISA bus is limited to 8 MHz. As higher speed processors were utilized, dedicated memory buses were added to personal computer systems because the ISA bus was too slow for the required high speed memory accesses. Video applications also became limited by the bandwidth of the ISA, so systems began to use a "local bus" for video applications. Although initially targeted at advanced video systems, new local bus specifications were made broad enough for handling other peripherals requiring high-bandwidth transfers such as mass storage devices and network interfaces.

The Peripheral Component Interconnect (PCI) bus is one example of a local bus specification. The VL bus is another local bus specification that has been less widely adopted. The PCI bus provides a high-speed interconnection system which runs more closely to microprocessor speeds than does a traditional expansion bus. And, although initially designed for 32-bit microprocessors, the PCI specification is broad enough to include the 64 bit data paths of the advanced processors. Legacy devices compatible with older bus architectures such as ISA connect to the PCI bus via a bus bridge circuit.

Many present day personal computer systems contain both a PCI bus and an ISA bus. The PCI bus is used to connect to newer peripherals and/or those peripherals requiring a higher speed interface. The ISA bus is typically connected to legacy devices. Historically, interfaces to peripherals utilized a large number of discrete components. However, the levels of integration has continued to increase in PC systems. As a result, much of the functional logic which is required to interface with peripheral devices has been integrated into a relatively few integrated circuits (ICs) which are sold as chip sets for the PC. The ICs include a plurality of terminals, pins, or leads, connecting the IC to the printed circuit board (PCB) to which the IC is mounted. The PCB functions as a system board. The terminals communicate input/output (I/O) signals between one IC and other ICs or I/O devices coupled to the system board. These system boards often receive expansion PCBs to increase the capabilities of the computer system and to connect to peripheral devices, e.g., through the ISA bus.

Referring, to FIG. 1, an exemplary prior art computer system 100 is shown conforming to the above architectural approach of including both a PCI bus and an ISA bus. Computer system 100 includes processor 110 which is coupled to secondary cache 115 and memory 140. Bridge 120 provides an interface between the processor/memory system 105 and PCI bus 125. Bridge 120 provides a communication link between PCI devices 150, 160 and 165 and the processor/memory system 105. In fact, although the PCI bus was originally intended for graphics, high speed graphics requirements have resulted in another specialized graphics bus called the Advanced Graphics Port Bus which can be utilized in place of the PCI bus for graphics applications. The PCI devices may be integrated circuits on the system board of computer system 100, expansion components connected to PCI bus 125 via expansion slots, or some combination thereof. A second bridge 130, provides abus interface between the PCI bus 125 the ISA expansion bus 135. In order to communicate with legacy devices which are designed to interface to the ISA bus, one approach, consistent with the trend towards increased integration in the PC, has been to provide Super I/O chip 170 rather than provide a number of discrete interfaces.

Super I/O chip 170 provides I/O terminals and control logic for commonly used legacy peripheral devices such as keyboards, IDE drive, IEEE parallel port, serial communication ports. One example of such a Super I/O chip is the National Semiconductor PC87306 Super I/O chip. Thus, legacy devices can be included in the system by utilizing the bridge 130, the ISA bus, and Super I/O chip 170.

SUMMARY OF THE INVENTION

It has been discovered to combine a bridge function such as a PCI bridge with a Super I/O function in a first integrated circuit. Further, it has been discovered to provide in the first integrated circuit logic for a parallel port to interface with an input/output bus and a second integrated circuit that provides logic and input/output terminals to interface with a parallel port.

Accordingly, the invention provides a first and second integrated circuit containing respectively a first and second portion of a parallel port, the first portion includes control, configuration, data and status registers and the second portion includes parallel port input and output terminals. A bus couples the first and second integrated circuits and transfers parallel port control and data information between the first and second integrated circuits. The bus includes a clock line providing a clock signal. A first port data out line provides first data from the first to the second integrated circuit. The first data includes a plurality of first data bits, each of the first data bits being synchronous with the clock signal. The first data includes data bits to be provided to the parallel port output terminals. A first port data in line provides second data from the second to the first integrated circuit. The second data includes a plurality of second data bits which are synchronous with the clock signal. The second data includes data bits indicating a state of the input terminals of the parallel port.

The invention also provides a method of partitioning a parallel port between a first and second integrated circuit. The method includes providing control, configuration and status and data registers on the first integrated circuit, the control, configuration, status and data registers having standard parallel port addresses. Parallel port input and output terminals are provided on the second integrated circuit. Output data is serially transferred from the first to the second integrated circuit over a data out line, the output data including control and a write data byte to be written to a peripheral device on the parallel port. Input data from the input terminals of the parallel port on the second integrated circuit is transferred to the first integrated circuit over a data in line.

The separation of the parallel port into two integrated circuits with one having the I/O terminals, alleviates the pressure on pin count and package cost on the first integrated circuit. The invention also provides the advantage of avoiding problems associated with reduced supply voltages. As process geometries shrink, supply voltages drop, e.g., to 3.3 volts or less, leading to problems interconnecting to the various super I/O interface pins. The super I/O typically drives legacy devices having 5 volt I/O logic. The smaller geometries utilized for today's faster and denser integrated circuits can have problems interconnecting at that voltage. The invention provides for building the first integrated circuit with the smaller process geometries to provide a faster and denser chip. However, the second integrated circuit can be built with slower technologies, e.g., where the transistors have channel lengths of 0.5 microns or above. Thus, the problem of connecting 5 volts legacy interfaces to integrated circuits made with smaller process geometries is also reduced.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIG. 8a shows the frame transmitted from the South Bridge to the port expansion circuit on Data Out.

FIG. 8b shows the frame transmitted from the port expansion circuit to the South Bridge on Data In.

FIG. 12a shows the frame transmitted from South Bridge to the port expansion circuit on Parallel Data Out for Standard/PS2 mode on the parallel port.

FIG. 12b shows the frame transmitted from the port expansion circuit to South Bridge on Parallel Data In for Standard/PS2 mode on the parallel port.

FIG. 16a shows the ECP mode bit assignments in the frame transmitted to the port expansion circuit from South Bridge.

FIG. 16b shows the ECP mode bit assignments in the frame transmitted from the port expansion circuit to South Bridge.

FIG. 20a shows the EPP Write mode bit assignments in the frames sent to and received from the port expansion circuit.

FIG. 20b shows the EPP Read mode bit assignments in the frames sent to and received from the port expansion circuit.

DESCRIPTION OF THE PREFERRED EMBODIMENT(S)

Figure 1:
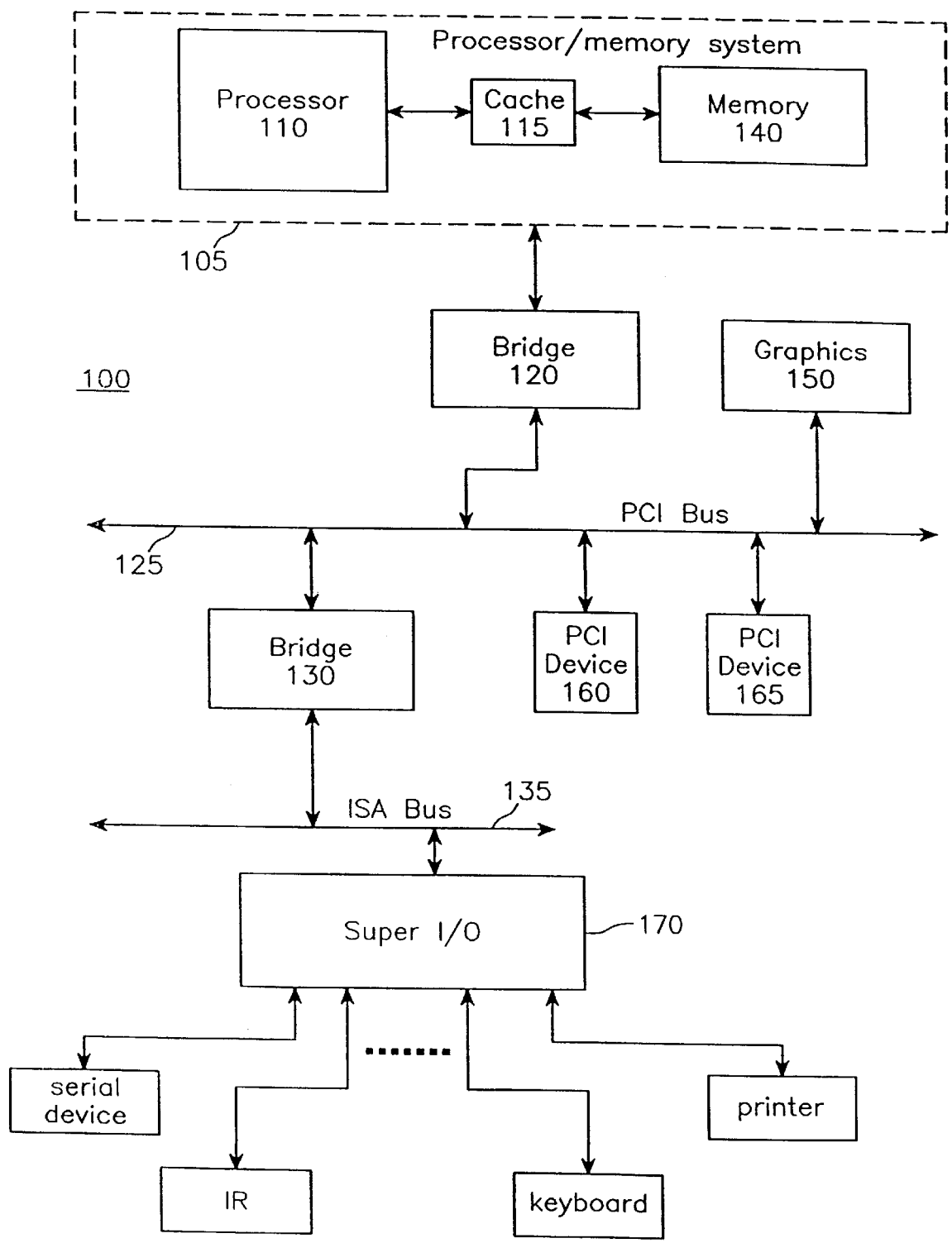
FIG. 1 shows a schematic block diagram of a prior art personal computer.
Figure 2:
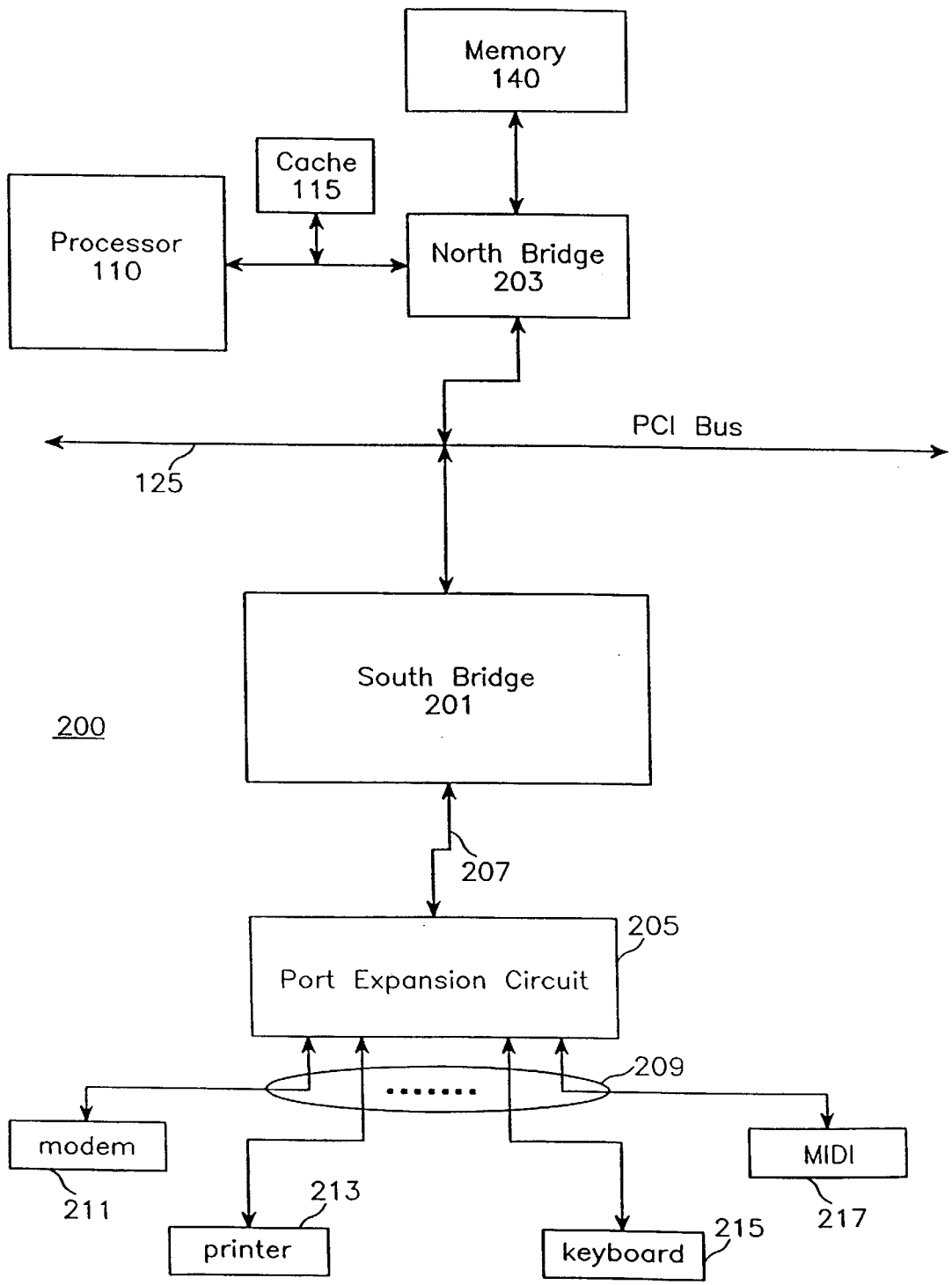
FIG. 2 shows a block diagram of a PC which includes a South Bridge circuit and port expansion circuit in accordance with the present invention.

FIG. 2 shows a personal computer system according to the present invention. The personal computer system comprises processor 110 which is coupled to cache memory 115 and memory 140. Bridge circuit 203 North Bridge), provides an interface between the processor and memory and the PCI bus 125. Bridge circuit 201 (South Bridge) provides an interface between PCI bus 125 and a plurality of legacy devices. A number of the I/O pins that would normally be required to provide I/O for the South Bridge are provided instead on a separate circuit 205, connected to the South Bridge 201 via port expansion bus 207. The separate circuit 205 will be referred to herein as the port expansion circuit (PEC). The port expansion circuit provides I/O 209 to connect to the plurality of legacy devices such as a modem 211, a printer 213, a keyboard and/or mouse 215 or an electronic instrument 217 through a Musical Instrument Digital Interface (MIDI). The port expansion bus 207 connecting port expansion circuit 205 and South Bridge 201 operates to transfer signals to be output to the legacy devices, from the South Bridge to the port expansion circuit 205. The port expansion bus 207 also operates to transfer signals that are received from the legacy devices from the port expansion circuit to the South Bridge. In a preferred embodiment, both the South Bridge 201 and the port expansion circuit 205 are each separate integrated circuits.

Additional legacy devices are also supported by the South Bridge in combination with the port expansion circuit and will be described further herein. The South Bridge includes the logic necessary to interface the legacy devices to the rest of the computer system through the ISA bus. In addition to the I/O function, the port expansion circuit may incorporate additional logic functions as described further herein.

Figure 3:
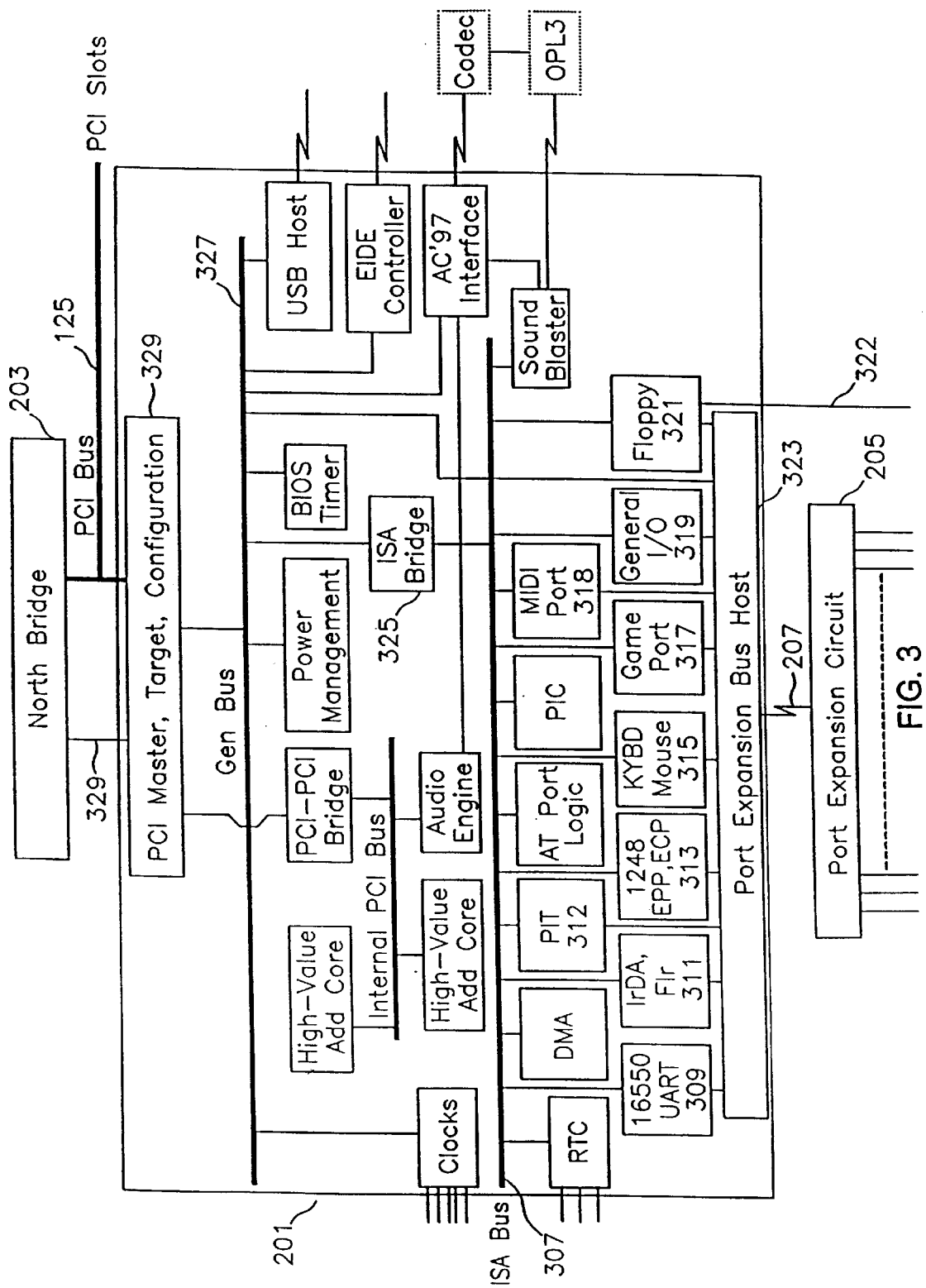
FIG. 3 shows a block diagram of the South Bridge circuit of the personal computer architecture of FIG. 2.

Referring now to FIG. 3, the South Bridge is shown in greater detail. Specifically, the South Bridge includes a number of logic blocks to support interfacing the most commonly used legacy I/O devices. For instance, in a preferred embodiment, the South Bridge may include one or more universal asynchronous receiver transmitter(s) (UART) block 309, which for the embodiment shown is a 16550 UART, an infrared (IR) interface block 311 which may support both the Infrared Data Association (IrDA) standard and the Fast IR standard, Programmable Interval Timer (PIT) 312 which couples to the PC speaker on the port expansion circuit side, a parallel interface controller 313 for the IEEE 1248 parallel port, interface logic 315 for the keyboard and for the mouse, interface logic 317 for the game port, interface logic 318 for a MIDI port and General I/O 319 which is described further herein. A floppy controller 321 is also provided. Note that in some embodiments the floppy controller may include some input/output pins on the South Bridge and in other embodiments all the input/output pins are on the port expansion circuit. When the data separator is on the port expansion circuit, all the pins can be reflected onto the port expansion circuit and the I/O 322 coming off the South Bridge becomes unnecessary. Note that the clock synthesizer "Clocks" (shown in FIG. 3) can be put on the port expansion integrated circuit 205.

Those logic blocks that logically interface to the legacy devices are coupled to ISA bus 307 which is internal to the South Bridge. Thus, in one preferred embodiment, the ISA bus has been incorporated into the South Bridge chip and certain of the legacy devices interface to the ISA expansion bus (input/output bus) through the interface logic in the South Bridge. ISA bus 307 is coupled through ISA Bridge 325 to bus 327 which in the embodiment shown is a simplified PCI bus. In turn, Bus 327 is coupled through interface block 329 to the PCI bus 125. The South Bridge also includes sideband signals 328 which are coupled to the North Bridge. Such sideband signals provide for legacy signals such as interrupts which can not be handled over the PCI bus.

Each of the functional blocks 307–321 provide the logic necessary to interface signals from the ISA bus 307 to each of the devices coupled to the port expansion circuit. For example, block 309 which is a 16550 UART can be connected to a serial communications device such as a modem. Block 313 may be connected to a printer or other device on the parallel port. The floppy control block 321 is coupled to a floppy drive and the game port can be coupled to two joysticks. The keyboard and mouse control block 315 can be coupled to a keyboard and a mouse. The function of the control blocks 307–321 in the South Bridge to interface to the legacy devices is well known and the detailed functioning of that logic will not be further described except when needed for a better understanding of the claimed invention. All these blocks require I/O connectors to provide signals to and receive signals from the various legacy devices.

Providing I/O capability for all the legacy devices as well as performing the bus interface and other functions on the South Bridge would require an IC with more I/O capability and would therefore could be a more expensive part. It is preferable to build an IC which can be more inexpensively packaged in, e.g., quad flat packs and avoid more expensive packaging such as ball grid arrays which can provide higher pin density but can also be more costly to produce. In many instances, reducing pin count significantly can reduce the package cost of the product.

Separating the I/O function from the logic function provides further advantages. As discussed, as process geometries shrink for faster and denser integrated circuits, e.g. channel lengths of 0.35 microns and below, supply voltages drop, e.g., to 3.3. volts or less, leading to problems driving the various devices on the super I/O interface pins which are typically 5 volts. The super I/O interfaces tend to be 5 volts interfaces which is typical of the legacy devices. Since high speed is desired for the South Bridge IC, it is preferable to build the chip with the smaller process geometries to provide a faster and denser chip. However, the port expansion circuit chip can be built with slow technologies, e.g., where the transistors have channel lengths of 0.5 microns or above. That allows the port expansion circuit to be built with older and less expensive process technology and also allows the port expansion circuit to easily interconnect to the 5 volts interfaces typical of the legacy devices. At the same time, the more speed sensitive South Bridge can be built with the most up to date process technologies providing channel lengths for the transistors of the internal logic of, e.g., 0.35 microns, without the problem of interconnecting to a large number of 5 volts interfaces.

Therefore port expansion circuit 205 provides the I/O terminals for the logic lock 309–321 for coupling the logic block 309–321 pins to the devices. That entails sending the output signals from the South Bridge to the port expansion circuit at a rate that is faster than the rate of change of the signals that are sent. Further, the input signals on the connectors of the port expansion circuit must be sent to the logic interfaces in the South Bridge for the particular device, such as a modem, at a rate faster than the rate of change of the signals from the particular device.

Each of the blocks 309–321 in the South Bridge are coupled to interface logic 323 also called the Port Expansion Bus host. The port expansion bus host interface 323 is also coupled to bus 327 so that the CPU can read and write certain registers in the host interface as described further herein. Note that the host interface 323 may be coupled to ISA bus 307 instead of, or in addition to bus 327.

Bus 207, which will be referred to herein as the Port expansion bus (PEB), couples host interface logic 323 to the port expansion circuit 205. Port expansion bus 207 is utilized to transfer the state of the output signals from the functional blocks 309–321 to the output pins of the port expansion circuit. Port expansion bus 207 is also used to transfer the state of the signals on the input pins of the port expansion circuit to the appropriate blocks in the South Bridge.

Figure 4:
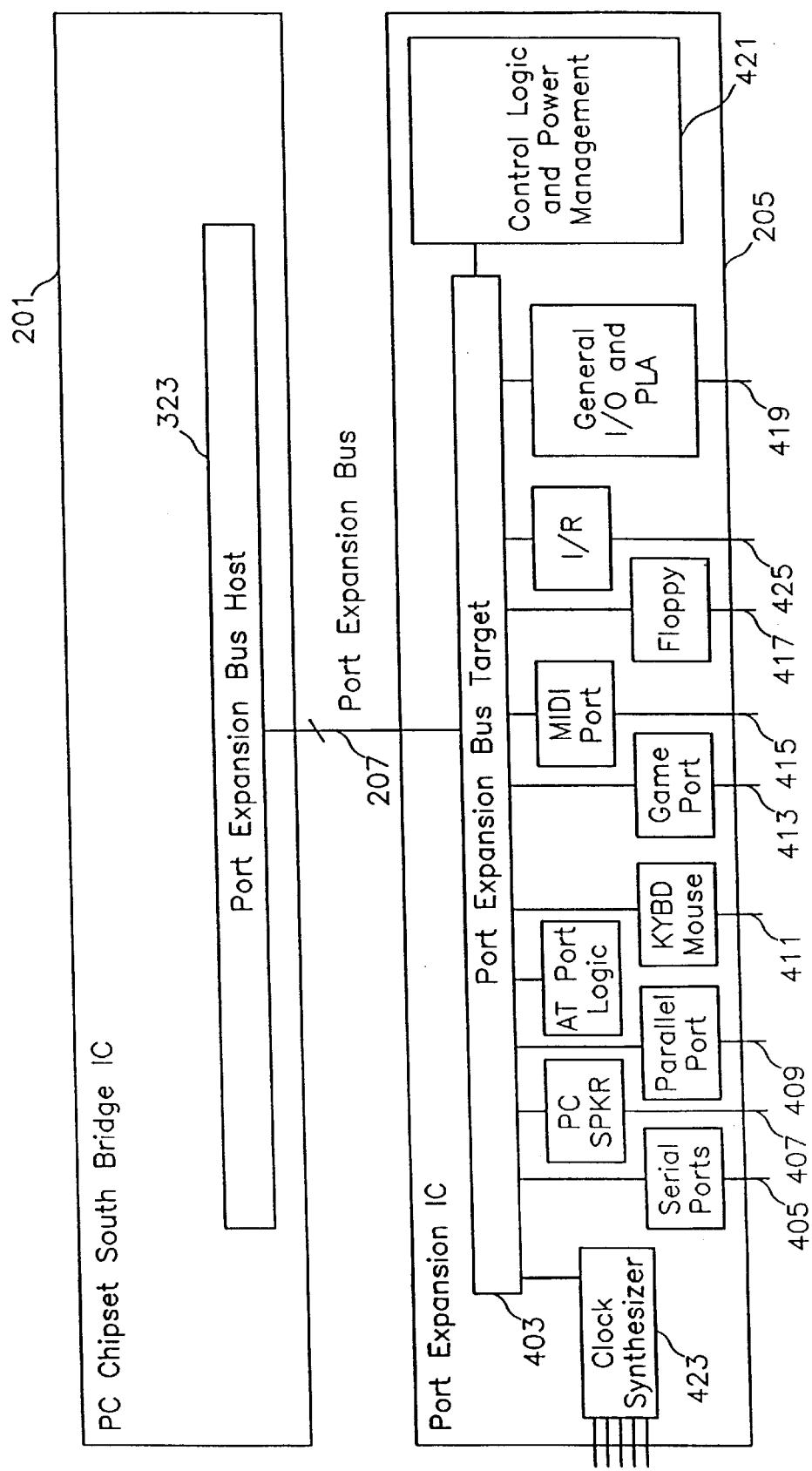
FIG. 4 shows a block diagram of a port expansion circuit (PEC) of the personal computer of FIG. 2.

The port expansion circuit 205 is shown in block diagram form in FIG. 4. The port expansion bus target interface 403 provides the interface to port expansion bus 207. Interface 403 provides signals from the South Bridge IC to the output pins for serial ports 405, PC speaker 407, parallel port 409, keyboard and mouse 411, game port 413, MIDI port 415, floppy 417, IR port 425 and General I/O 419. Control block 421 provides control function for interface 403. Control block 321 also provides a power management function which is discusses further herein. In addition, the control block decodes commands sent from the South Bridge and maintains status information which can be provided to the South Bridge as discussed further herein. Clock synthesizer 423 provides the multiple clocks which are required by the PC system. The clock synthesizer is also discussed further herein.

In order for the Port Expansion Circuit 205 to provide I/O function for the South Bridge IC, the output signals from the interface logic blocks in the South Bridge IC have to be reflected onto the output pins of the port expansion circuit. Therefore, the output signals have to be sampled in the South Bridge and provided to the output pins of the port expansion circuit at a rate faster than the output signals change. Additionally, the input signals on the input pins of the port expansion circuit have to be sampled and provided to the interface logic blocks in the South Bridge IC at a rate faster than the input signals change. In one exemplary embodiment, a protocol-free six wire bus running at about 50 MHz provides the necessary bandwidth to allow the port expansion circuit to provide I/O for the various interface logic blocks in the South Bridge. Utilizing such an approach can reduce the South Bridge pin count by approximately 70 or more pins. Such savings in pin count generally leads to a less costly chip.

The bus comes in several preferred embodiments. In a first embodiment, which is intended to provide pin reflection capability for slower devices, the bus is a basic four-pin serial bus shown in FIG. 5. A second embodiment of the bus is provided in order to support higher speed ports, e.g., to provide the necessary bandwidth for the higher speed parallel port. In some circumstances, only the first embodiment may be necessary, if for instance, the parallel port is not utilized or is connected to the South Bridge rather than the port expansion circuit, or if the speed of the port expansion bus is increased significantly.

Figure 5:
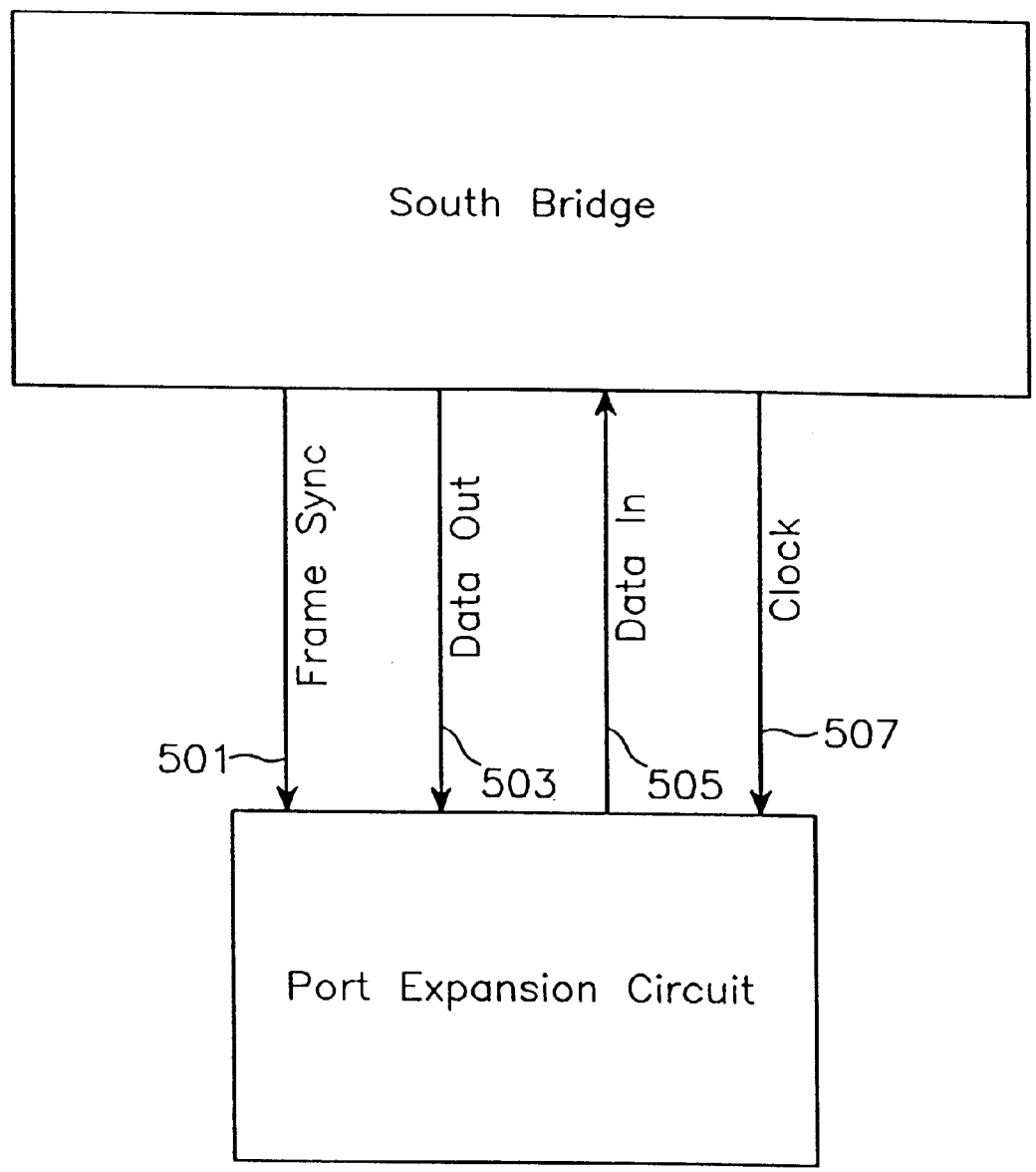
FIG. 5 shows a four line embodiment of the bus connecting the South Bridge and the port expansion circuit of the personal computer of FIG. 2.

Referring now to FIG. 5, the first embodiment of the bus includes a frame sync signal 501 and a synchronous data clock 507 and a Data In line 505 (data from the port expansion circuit to the South Bridge), and Data Out line 503 (from the South Bridge to the port expansion circuit). In the exemplary embodiment, the nominal clock rate is 50 MHz and a frame is chosen to contain 96 bits. Other frame lengths and clock rates are of course possible.

Figure 6:
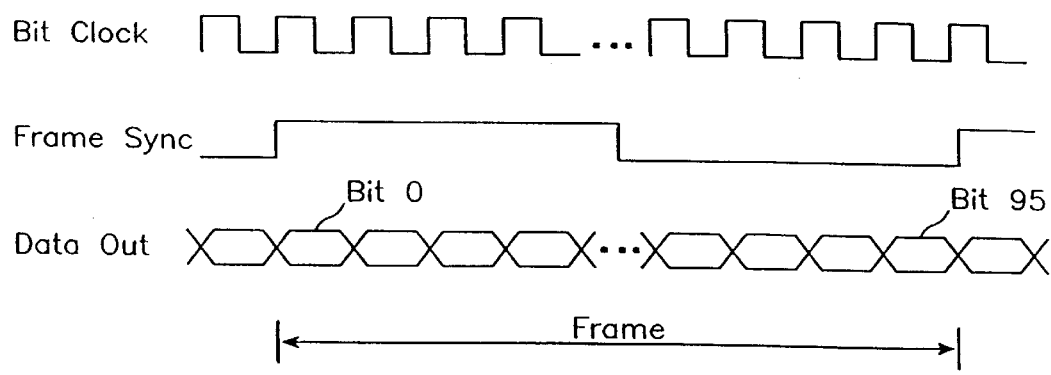
FIG. 6 is a timing diagram for the port expansion bus (PEB).
Figure 7:
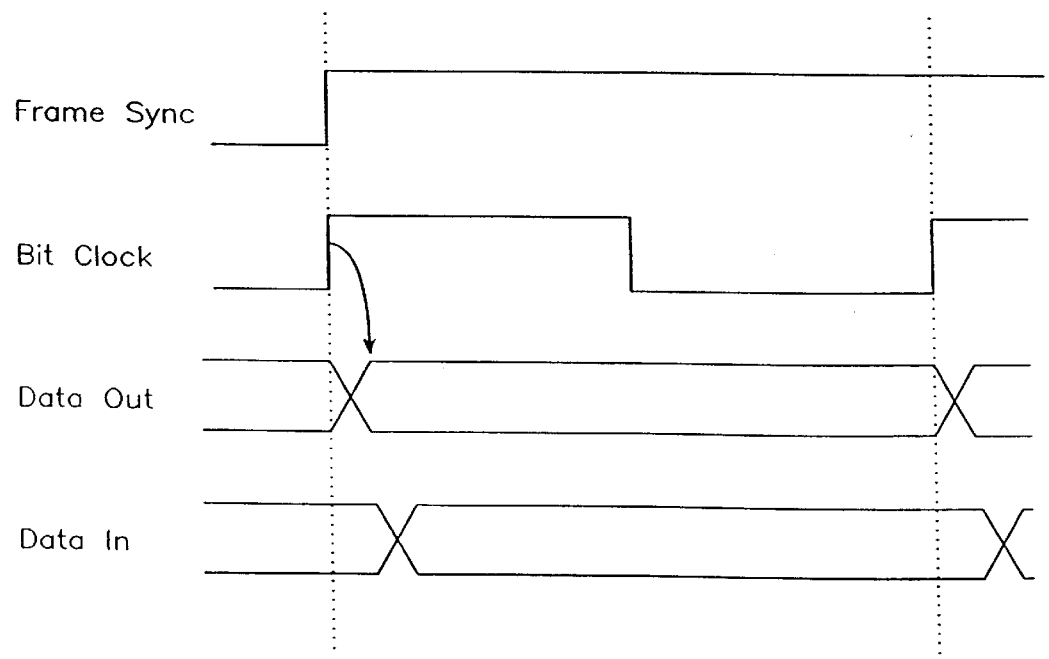
FIG. 7 is a timing diagram showing the relation between the frame sync signal, the bit clock, Data In and Data Out on the port expansion bus.

Referring to FIG. 6, the beginning of each frame is determined by assertion of the frame sync signal. The frame sync signal is preferably a 50% duty cycle signal to facilitate counting frame bits. Other duty cycles are of course possible. In one embodiment, a frame consists of 96 clock periods or 96 data bits. Other frame lengths are possible, e.g., 32 data bits. Referring to FIG. 7, one data bit is provided on the Data Out and Data In line each clock period during each frame. The data bits are provided relative to the rising edge of the bit clock in the embodiment shown. With a frame of 96 bits, the frame rate is nominally 500 kHz. Each bit in each frame that represents an I/O bit is sampled and provided from/to the appropriate I/O pin of the port expansion circuit approximately every 2 microseconds. That speed is sufficiently high to support most of the legacy devices supported by the port expansion circuit. In another embodiment, the clock rate is 33 Mhz, data is clocked on both rising and falling edges of clock. Thus, two bits are provided during each clock period.

In order to help ensure that the interfaces to the legacy devices operate correctly, i.e., that the I/O signals are adequately reflected, in a preferred embodiment, the bus is "protocol free," in that there are no activation sequences or complex state machines required. The bus is simply a 96-bit time-slot structure where each bit time is assigned a specific function. FIGS. 8a and 8b show the non-parallel port bit time slot assignments to and from the port expansion circuit. All bits in FIGS. 8a and 8b are numbered with respect to the leading edge of frame sync. In addition to being "protocol free", the bus operates to continuously transfer frames between the port expansion circuit and the South Bridge. The frames are contiguous in that there is no time between each frame, i.e., the start of bit 0 is one clock period from the start of bit 95. However, other embodiments may provide some time periods between frames so long as the port expansion bus stays substantially continuously running sufficient to satisfy the speed requirements of the pin reflection approach described herein. Note that the I/O pin values are transferred every 2 microseconds whether they change or not. However, the bus does not operate while the port expansion circuit and South Bridge are in a power down mode to reduce power consumption.

Referring again to FIGS. 8a and 8b, the frame includes provision (Link Command/ Status) for transmitting commands to the port expansion circuit and receiving back status from the port expansion circuit. Commands are transmitted from the South Bridge to the port expansion circuit via the first nine bits of the frame. Bit 0 is a flag that, when set, indicates that the command field is valid and therefore a new command is being transmitted. Bits (1:8) contain the command byte—thus there are 256 possible commands. The individual commands can be, for example, requests for the port expansion circuit to take some action (such as entering a power management state) or a request to read a register within the port expansion circuit.

Figure 9A:
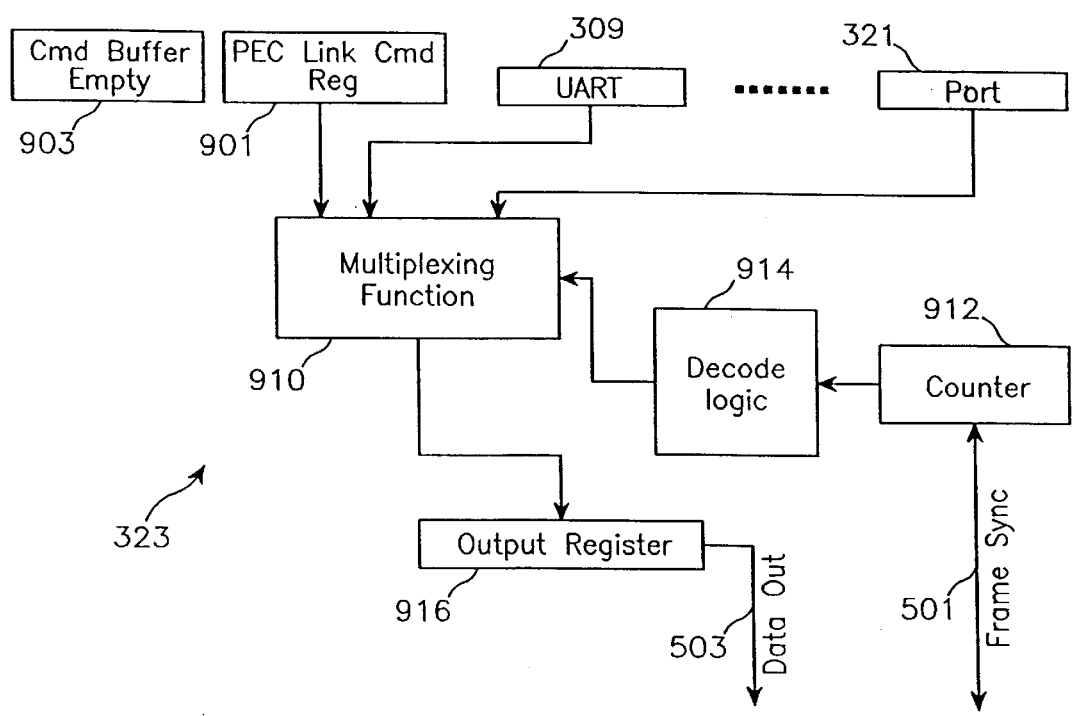
FIG. 9a is a schematic block diagram of the port expansion bus host interface in the South Bridge.

Commands are sent only once. That is, the Valid bit (bit 0) is only active for a single frame. Commands are transmitted during the next frame following a CPU write to the port expansion circuit Link Command Register 901 which is located in the host interface in the South Bridge as shown in FIG. 9a. There is no provision for buffering up commands. A Command Buffer Empty status bit 903 is provided in the South Bridge indicating that a new command can be sent.

When the Valid bit (bit 0) is inactive, the link command bits 0–7 may be used to transfer other information such as static command information. Such static command information may include a "keep alive" field which informs the port expansion circuit that the South Bridge is still present.

In the receive frame received from the port expansion circuit, the bits corresponding to the link command bits in the transmit frame are link status bits (bits 1:8). The status field has two modes. First, the status field presents static status information, i.e., the eight bits reflect the current status of the port expansion circuit. The static status field my include such information as the mode of the parallel port, the mode in which other ports are operating, the power mode of the port expansion circuit and any diagnostic information available. Secondly, the status field can be used to return read data requested by the a specific command sent from the South Bridge, i.e., a command sent from the South Bridge in the Link Command field requesting that specific data, such as the contents of a register, be returned. The Response/ Status bit (bit 0) indicates which mode the link status field is operating in during that frame.

Figure 9B:
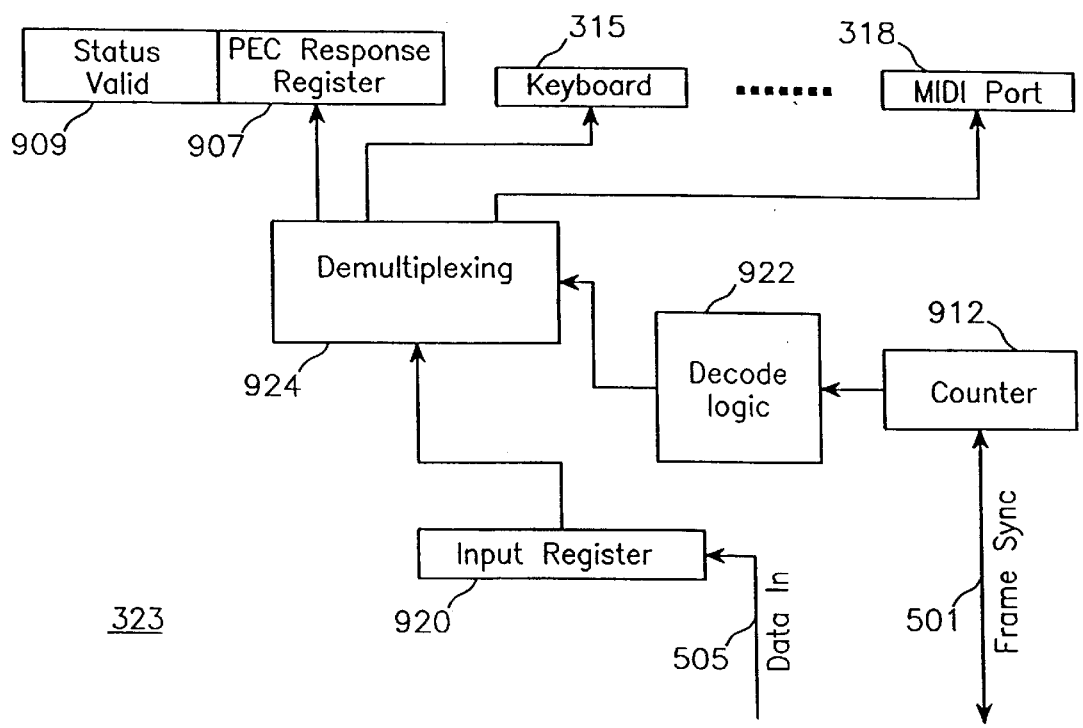
FIG. 9b is a schematic block diagram of the receive logic of the port expansion bus host interface in the South Bridge.

When the Response/Status bit is active, the data field (bits 1:8) contains the response to a request received in the immediately preceding frame. Responses are only sent for a single frame time. Referring to FIG. 9b, there is only a single byte buffer 907 (the port expansion circuit Response Register) for received responses located in the South Bridge. User software should not transmit additional response requests until it has read the data from the port expansion circuit Response Register. A status valid bit 909 is provided indicating the availability of valid data in the port expansion circuit Response Register for the CPU. The bit is cleared when the port expansion circuit Response Register is read. Static status information is transmitted during all frames where the Response/Status bit is not asserted.

With the exception of the link command/status field, printer port data fields, game port X and Y comparators, and reserved bits, all bit positions in the frame are "reflected pins." In essence, the state of a signal on the transmitting side of the link is reflected to a signal on the other side. The state of each bit is updated each frame time (nominally every 2 microseconds). In this way, the states of relatively slow changing signals can be transmitted over a time-division serial bus and recreated on the other side. The state of input pins on the port expansion circuit are sent to the South Bridge via the Data In pin. The state of output pins on the port expansion circuit are sent from the South Bridge via the Data Out pin.

Referring again to FIGS. 9a and 9b, the port expansion bus host interface 323 in the South Bridge is shown in greater detail. The various bits located at the output; of the logic interface blocks 309–321 are provided to multiplexing logic block 910. The correct bit is selected for output onto Data Out line 503 at the right time slot based on the value in the counter 912. Decodes of the counter value is used in decode logic 914 to select the appropriate bit to output at the particular time slot. In one embodiment, output register 916 may be implemented as a serial shift register, that is loaded up every 8 bit clocks with new data to be shifted out.

FIG. 9b shows additional details on the receive side of the host interface 323. Data In is received on the Data In line 505 from the port expansion circuit and placed in the input register 920. In some implementations, register 920 may be a single bit and in other implementations, it may be a serial shift register which buffers, e.g., a byte of date before the data is provided to the appropriate logic interfaces. The decode logic 922 which directs the input data through logic 924 to the appropriate ports, e.g., ports 315–318, may have significant overlap with decode logic 914 shown in FIG. 9a. When a bit is received, it is transmitted to the appropriate interface and clocked into the input port of that interface. That function may be accomplished by enabling a clock to that input latch when the time slot for that bit has been received.

Figure 10:
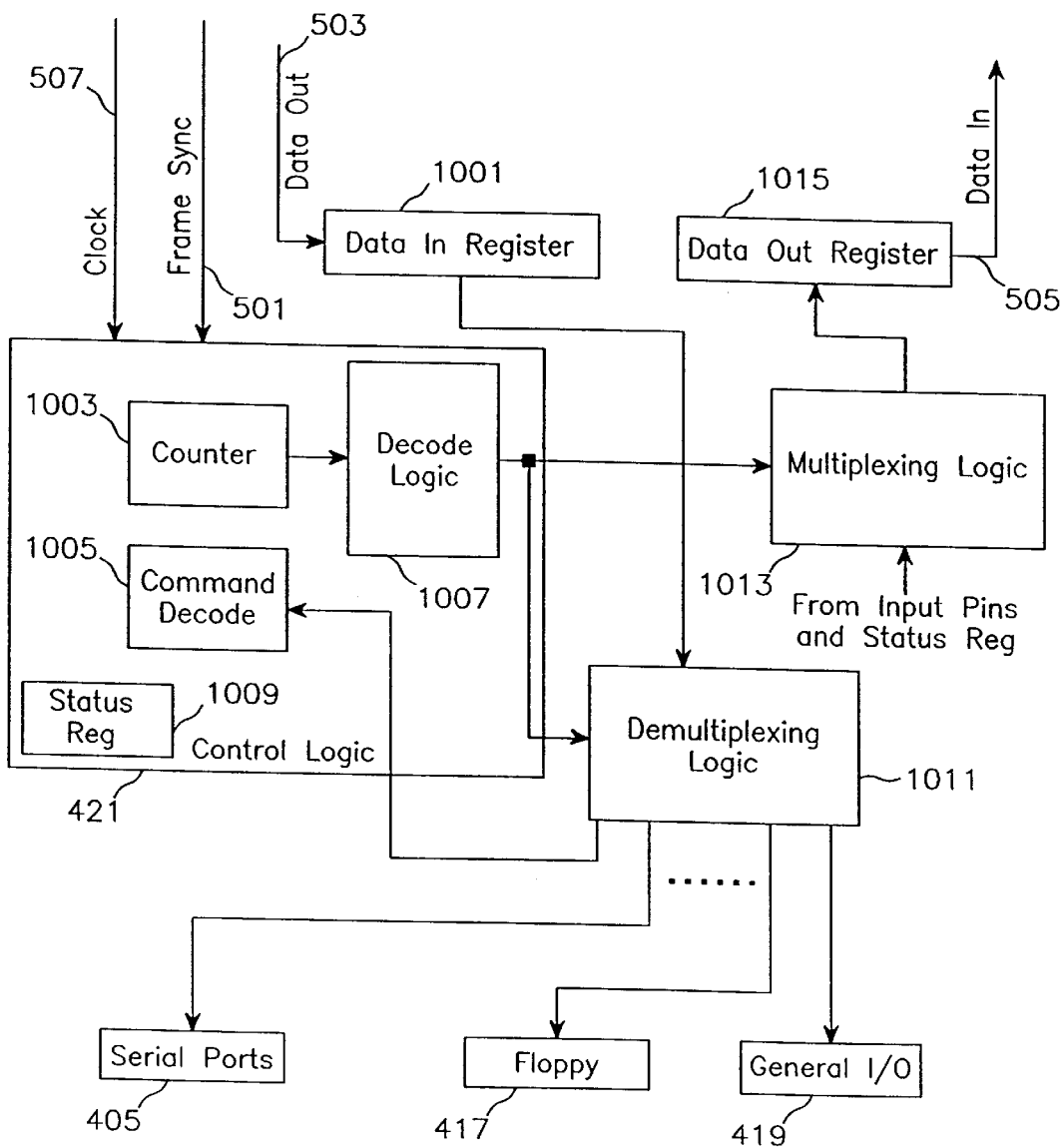
FIG. 10 is a schematic block diagram showing further details of the port expansion circuit.

FIG. 10 shows additional details of the port expansion circuit. Data is received on Data Out line 503 from the South Bridge. It is received into a data register 1001 and sent to the appropriate I/O port 405 through 419 based on the counter value in counter 1003 and decode logic 1007 and logic 1011. Logic 1011 may provide a clock to the appropriate output port at the appropriate bit time. The control logic 421 includes the command decode logic 1005 to decode commands sent from the South Bridge as well as status register 1009. Data bits received from the I/O ports are assigned to their correct bit times in each frame by multiplexing logic 1013 and provided to the data out register 1015 at the appropriate bit time.

An example of pin reflection according to the invention is as follows. The PC Speaker is connected to the counter-timer block 312 in the digital signal output by frequency of the speaker is determined by the frequency of the digital signal output by the counter timer block 312 which is an 8253 or 8254-2 equivalent timer/counter. At the start of bit time 82 of each frame, the state of the counter timer's PC Speaker output is sampled. Bit position 82 in the fame transmitted to the port expansion circuit is updated to reflect the sampled state. At the port expansion circuit end, the state of the Data Out pin is latched during bit time 82. The PC Speaker pin on the port expansion circuit always reflects the latched value. Thus, the PC Speaker pin always reflects the state of the counter timer output, with a delay of up to 2 microseconds.

Functions within a personnel computer system that utilize pin reflection and can be supported by the 4 pin bus described herein include the PC Speaker, MIDI Port, Keyboard, Mouse, Serial Ports and General I/O. The Parallel Port and the Game Port and the Floppy port may not use pin reflection for all functions.

The transmit frame shown in FIG. 8a includes bits 32:42 for the floppy disk drive. Serial port 0 and serial port 1 are provided in bits 48:50 and 53:55, respectively. Bits 54 to 57 may also be used for an infrared port such as the Infrared Data Association (IrDA) port. Bits 65:68 are utilized for the game port. Bit 82 provides the PC speaker out. Bit 83 is a MIDI transmit (TX) bit. Bits 84–95 are user defined bits. The remaining bits are reserved for future use.

The receive frame is shown in FIG. 8b includes bits 32:35 as inputs from the floppy drive. Bits 48:57 are serial port 0 and serial port 1 bits. Bits 54:57 may be utilized for an IrDA port or a mouse as indicated. Bits 65:72 are utilized for the game port inputs. Bit 83 is a MIDI receive (RX) bit. As shown bits 84–95 are examples of what might constitute general I/O bits. For example, bit 84, Vol+, bit 85 Vol– and bit 86, mute, could be used to control speakers that are resident in a terminal. Bit 87 can be used as a key lock indicator indicating the status of the lock on the front of the computer. The turbo bit can indicate if the PC is in turbo mode. Setup disable can indicate that the user of the PC is prevented from going into a setup mode. CLR CMOS is used to clear battery backup memory containing basic system configuration such as what drives are installed and how much memory is available. Bits 91–94 could be used to indicate the status of dip switches on the board. Bit 95 is a general I/O bit. The remaining bits in the frame are reserved for future use.

While the 500 kHz update rate is sufficient for the signals described so far, that update rate may not be fast enough for certain of the devices. For instance, the PC parallel port is capable of transferring up to 2M-bytes per second. As a result of this data rate, it is not practical to simply reflect the state of the printer port's pins across the serial bus described in the first embodiment. Thus, a second embodiment is provided.

Figure 11:
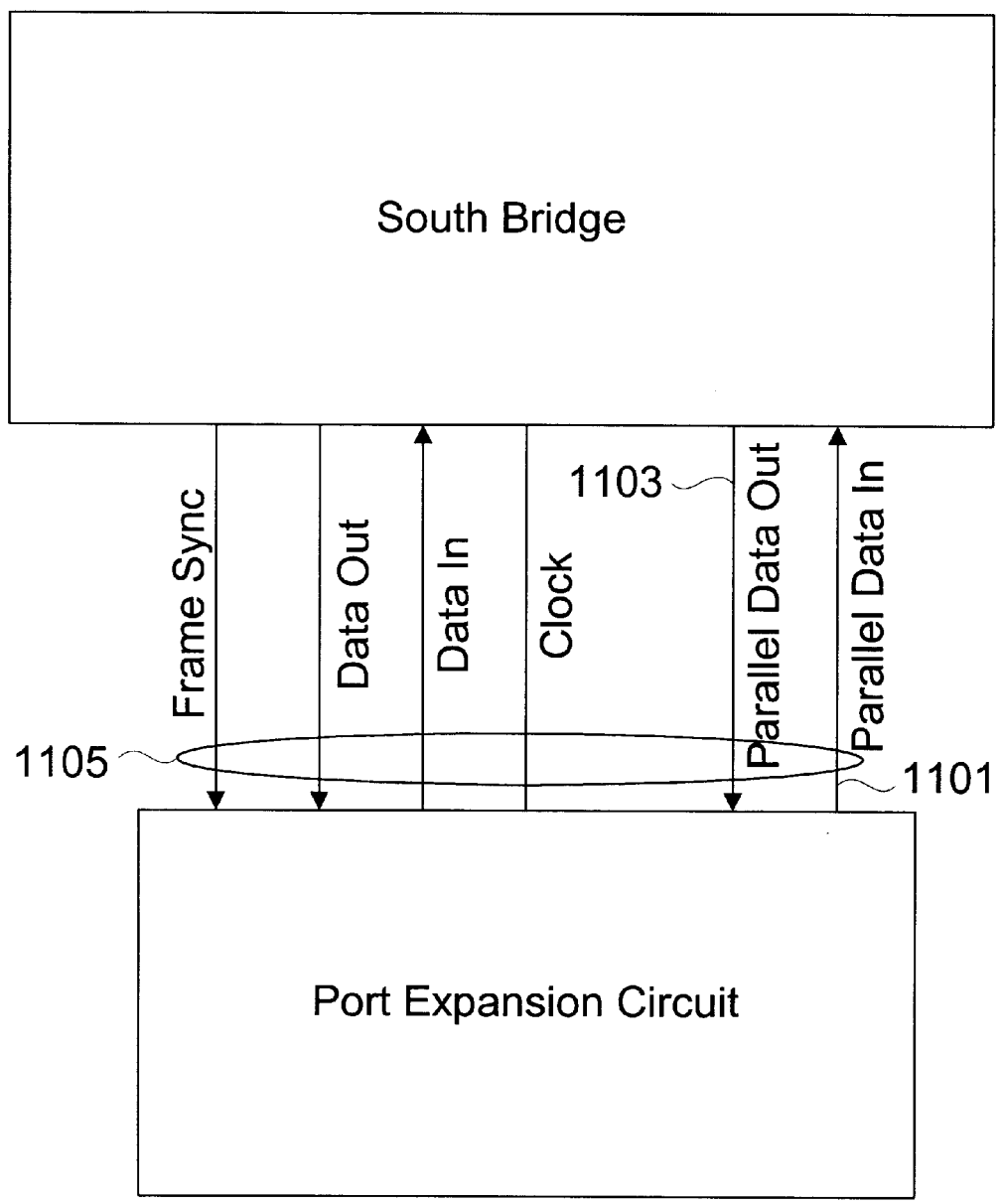
FIG. 11 shows a six line embodiment of the port expansion bus.

Referring to FIG. 11, the set of four pins of the first embodiment is supplemented by a second pair of data pins 1101 and 1103, Parallel Data In and Parallel Data Out, respectively, which are dedicated to the parallel port. The combination of data pins 1101 and 1103 and the first embodiment of the port expansion bus (having Frame Sync, Data Out, Data In, and Clock) provides the second embodiment 1105 of the port expansion bus. Additional dedicated pins may be utilized for other fast devices which can not be supported by the first embodiment of the port expansion bus. The static pins are reflected in the normal way across Parallel Data In and Parallel Data Out, while the data pins and necessary timing strobes are generated within the port expansion circuit. The dedicated data pins support the different parallel port modes that are defined in the IEEE 1284 specification ("IEEE Standard Signaling Method for a Bidirectional Parallel Peripheral Interface for Personal Computers"), which is incorporated herein by reference. The IEEE 1284 parallel port specification outlines a number of separate operating modes, including: (1) Standard (2) PS2 (3) Enhanced (EPP) and (4) Extended Capabilities (ECP). The Link Command field (bits 0:8) is used to specify the operating mode of the parallel port.

FIGS. 12a and 12b shows the bit assignments for data transmitted over the two dedicated date lines for Standard and PS2 mode operation for the parallel port. The bits are numbered with respect to the leading edge of frame sync. Unlike the assignments for the other ports controlled through Data In and Data Out, the field sent over Parallel Data In and Parallel Data Out line is repeated six times every frame. The content of each data field is the same and is described for field 0. Data field 0 includes a valid bit indicating that data in the field is valid (bit 0), 8 bits of data (bits 2:9) to transmit to the printer port, bits for STB/, PDIR, INIT/, AFD/, SLIN (bits 10:14, respectively) and several reserved bits. The use of multiple time slots for the same function, i.e., repeating the data field six times per frame, reduces the latency of parallel port data transmitted over the port expansion bus. In a similar fashion, the parallel port frame received from the port expansion circuit, as shown in FIG. 12b, has six data fields containing data received on the parallel port. Each data field includes a valid bit indicating that data in the field is valid, 8 bits of data received from the printer port (bits 2:9), a Busy, ACK/, PE, SLCT, ERRI (bits 10:14, respectively) and several reserved bits.

Figure 13:
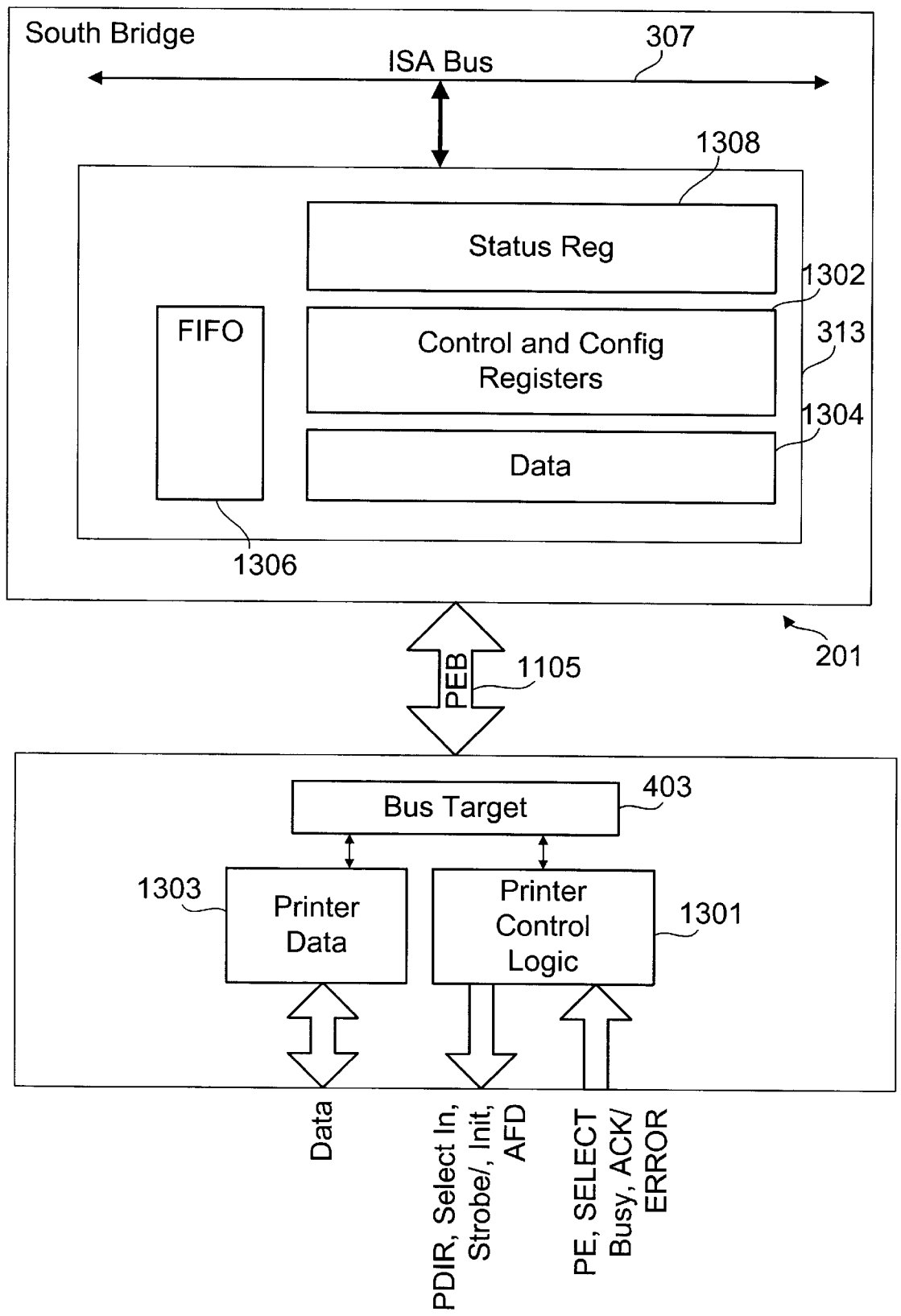
FIG. 13 shows a schematic block diagram of the parallel port in the South Bridge and the port expansion circuit.
Figure 14:
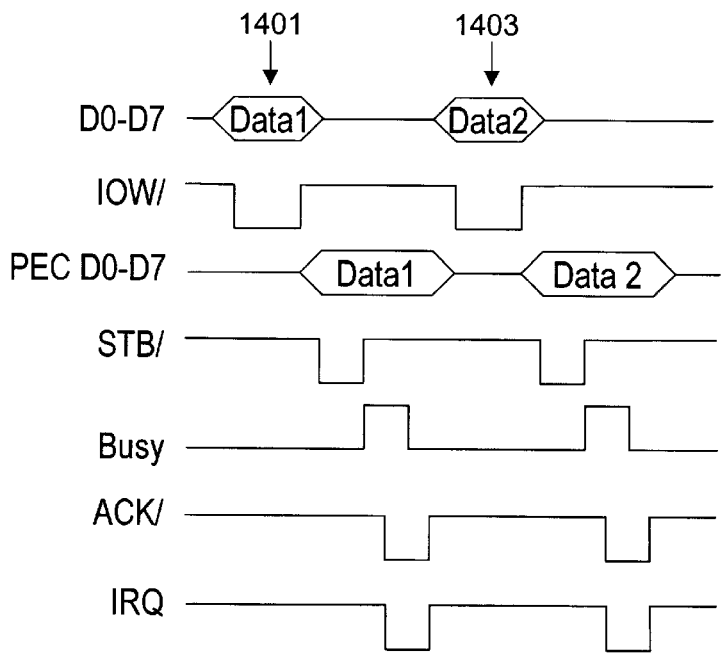
FIG. 14 shows a timing diagram of a parallel port write in standard mode.

In standard mode, which provides write only capability, typically to a printer, the South Bridge and port expansion chip operate as follows. The write operation is totally controlled by CPU I/O reads and writes of command and status bits. Referring to FIGS. 13 and 14, in a typical standard mode cycle, the CPU writes data 1401 to the parallel port data register 1304 in the parallel interface controller block 313 in South Bridge 201. The CPU also writes the control register contained in the control and configuration registers 1302 in parallel interface controller block 313, setting bit (0) of the control register, which after transmission to the port expansion circuit, activates the strobe (STB/) pin. The CPU also can set or clear control bits AutoFeed (AFD/) (the backslash indicating an active low signal), initialize printer (INIT/) and select input (SLIN) contained in the control register. The control bit AFD/ determines how the printer reacts to a carriage return. The control bit INIT/ causes the printer to initialize. The SLIN/ bit allows the CPU to bring the printer on and off-line for printers supporting that feature. Further details on Standard mode operation can be found in the IEEE 1284 specification mentioned previously.

The data from block 313 is transmitted to the port expansion circuit in continuous frames. For example bits 2–9 of field 0, as shown in FIG. 12a provide the data byte while bit 10 provides the strobe bit. If the strobe bit is active, the port expansion circuit will output the strobe and data PEC D0–D7, as shown in FIG. 14. In response to the active strobe, the printer activates the Busy pin as also shown in FIG. 14. The information on the Busy pin is transmitted from the PEC to the South Bridge in, e.g., bit 10 of field 0 transmitted to the South Bridge and shown in FIG. 12b. Of course, the value of the Busy pin, is also sent in all other fields in the frame. Once the data has been processed by the printer and the printer is ready to receive the next byte of data, the printer activates the acknowledge (ACK/) pin. That is transmitted as bit 11 in field 0 as shown in FIG. 12b. The ACK/ signal going active causes the South Bridge to generate an interrupt (IRQ) to the CPU. If more data is to be sent, then the CPU repeats the cycle by writing data 1403 to the parallel port data register.

Note that toggle of an input pin must cause the port expansion bus time slot to send at least one change of state. For example, if an input pin toggles from a 1-0-1, and the 0 changes back to 1 before the 0 has been placed onto the port expansion bus, then the time slot assigned to that input pin on the port expansion bus must reflect at least one change of state. Thus, for a 0-1-0 toggle, the port expansion bus time slot for that bit must transfer a 1 at the next frame after the toggle and then a 0 in the subsequent frame. In other words, any changes on the input pins must be latched and the input pin cannot change state again until read. The assertion of ACK/ and Busy pulse must also cause the port expansion bus time slot to send at least 1 change of state. The CPU can also read the status of Error, Paper Empty (PE), Busy/, ACK/, Select (SLCT).

Referring to FIG. 13, the port expansion circuit control logic 1301 receives the control bits Select In/ (SLIN/), Strobe (STB/), Init, AFD/ from the South Bridge over the port expansion bus 1105 and receives from the printer PE, Select (SLCT), Busy, ACK/, and Error (ERR/). The receipt of an asserted Strobe bit from the South Bridge causes the printer control logic to output the control signals as shown in FIG. 13. The printer data register in the PEC receives data from the South Bridge and outputs the data to the 8 parallel port data pins.

Figure 15:
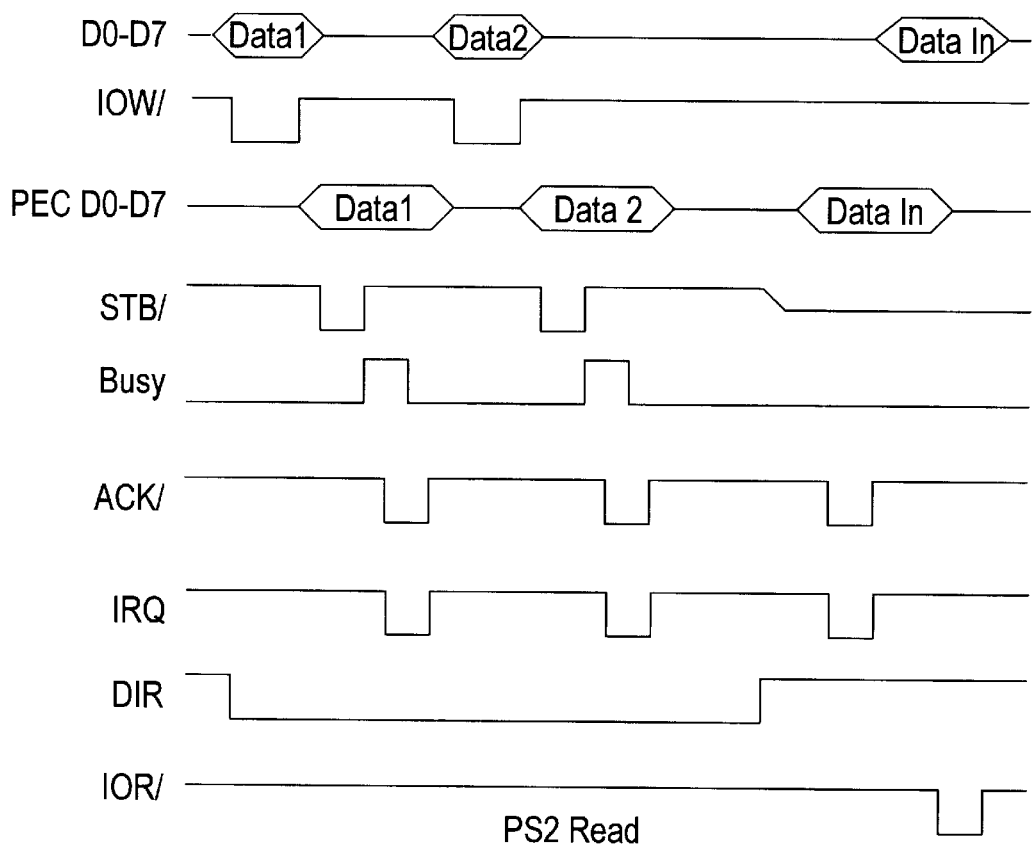
FIG. 15 shows a timing diagram of a parallel port read in PS/2 mode.

PS2 mode provides a read enhancement to the Standard mode so that it becomes a Read/Write version of the Standard Mode. The write operation is the same as Standard mode except that the CPU sets the Direction bit using the bit provided in each data field transmitted to the PEC, which drives the PDIR pin from the PEC, indicating the direction of transfer. The Read operation is the same as Write except that the Strobe signal is tri-state and busy is not used. Data is latched in the PEC on the trailing edge of ACK/ as shown in FIG. 15. The latched data is provided to the South Bridge in each packet transmitted from the PEC to the South Bridge.

The Extended Capabilities Port (ECP) mode provides totally automated read and write cycles. It is FIFO-based and uses DMA. The FIFOs are in the South Bridge. There is a Run Length Encoding (RLE) compression option. The read expansion is done in hardware and the write compression done in software.

FIGS. 16a and 16b show the bit assignments for data transmitted over the two dedicated parallel port data lines for ECP mode operations. The bits are numbered with respect to the leading edge of frame sync. Like the assignments for Standard/PS2 operating modes, the fields are repeated six times for each frame. The content of each data field is the same and is described for field 0. Data field 0 includes a valid bit indicating that data in the field is valid (bit 0), a Data-CMD bit (bit 1), 8 bits of data/CMD (bits 2:9) to transmit to the printer port, INIT/, AFD/, SLIN (bits 12:14, respectively) and several reserved bits. The data field repeats six times per frame to reduce the latency of parallel port data transmitted over the port expansion bus. In a similar fashion, the parallel port frame received from the port expansion circuit has six data fields containing data received on the parallel port by the port expansion circuit. Each data field includes a valid bit indicating that data in the field is valid, an RLE bit indicating if the byte is an RLE byte, 8 bits of data received from the printer port (bits 2:9), PE, SLCT, ERR/ (bits 12:14, respectively) and several reserved bits.

In ECP mode, a typical write operation of command or data to a printer works as follows. Referring to FIG. 13, the CPU writes data to data register 1304 contained in the parallel interface controller block 313. Note that the data may be an address. Alternatively, the CPU may write to FIFO 1306 in the South Bridge or DMA may be used. The registers necessary for ECP control as specified in the IEEE 1284 specification are contained in interface controller block 313. Table 1 shows the parallel port register definitions and addresses for ECP mode and the other modes. The registers are contained in South Bridge. The processor writes to the extended control register to determine the mode in which the parallel port in the South Bridge and PEC operate.

TABLE 1

| Address | Mode | Function |
| --- | --- | --- |
| Base | PC, PS/2 | Data Register |
| Base | ECP | ECP FIFO (Address) buffer |
| Base + 1 | All | Status register |
| Base + 2 | All | Control register |
| Base + 400 | EPP | EPP FIFO (data) buffer |
| Base + 400 | ECP | ECP FIFO (data) buffer |
| Base + 400 | Configuration | Configuration register A |
| Base + 401 | Configuration | Configuration register B |
| Base + 402 | All | Extended control register |

Figure 17:
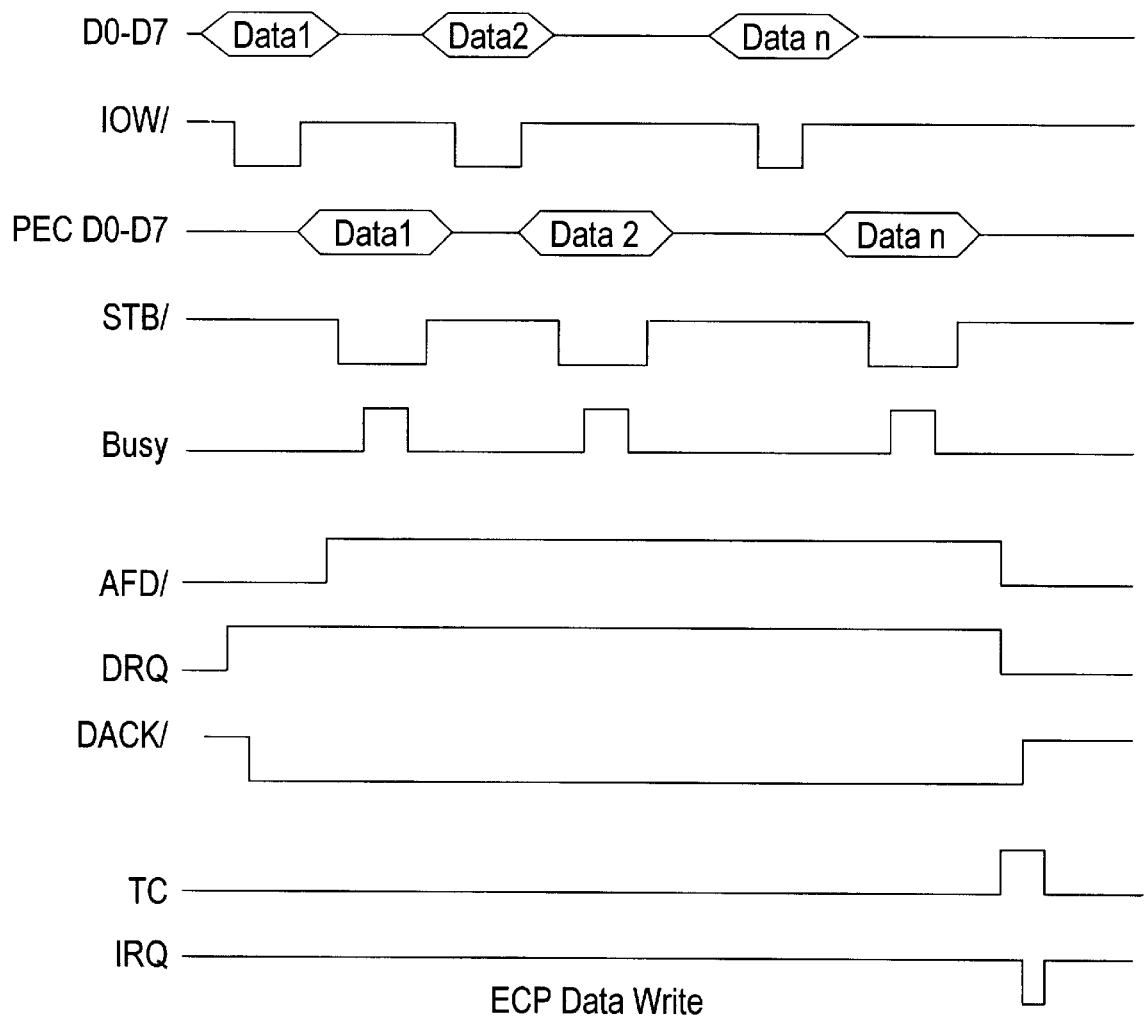
FIG. 17 shows a timing diagram of a parallel port data write in ECP mode.

Once data has been written into the South Bridge, it is sent over to the PEC via the bus. The data field valid bit would be set along with an indication as to whether the data is command or data. Once valid data is received in the PEC, parallel port logic 1301 in the PEC generates a Strobe/ automatically when a write takes place instead of requiring the CPU to write a control register as in Standard mode. Note that the printer control logic 1301 has to be set up to be in ECP mode via the link command field shown as bits 0 to 8 in FIG. 8*a*. A write to the extended control register automatically causes the command to be sent via the link command field. The timing for a write operation is shown in FIG. 17. The printer responds with Busy. The trailing edge of Busy allows Strobe/ to go inactive. The AFD/ pin, which is used as the Command/Data indication, is cleared or set according to the tag bit sent with each data byte (the FIFO contains one tag bit per byte). In FIG. 17, the AFD/ pin is set high indicating a data mode operation. For a command mode operation, the AFD/ pin would be low during the same time period.

The Direction pin (static) is controlled by software (a tag field is included with each data byte indicating direction).

Figure 18:
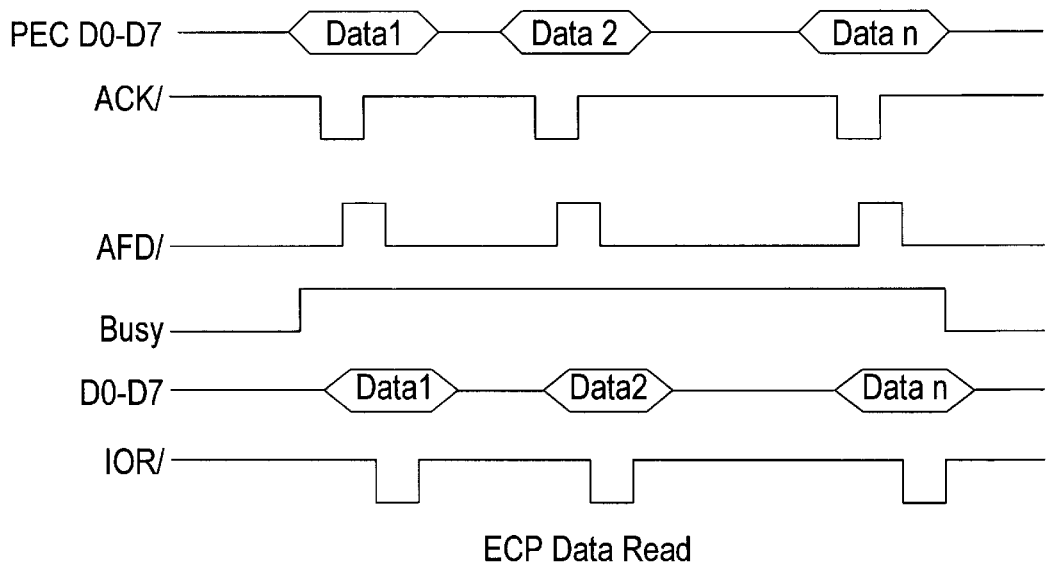
FIG. 18 shows a timing diagram of a parallel port data read in ECP mode.

An ECP mode, read operation, non-compressed, is shown in the timing diagram in FIG. 18. The CPU sets the direction bit to indicate input. The printer sends data which is latched into the port expansion circuit on the trailing edge of ACK/. The leading edge of ACK/, from the peripheral device causes the port expansion circuit state machine to activate AFD. The trailing edge of ACK/ allows the port expansion circuit to deactivate AFD. Data is sent to the FIFO in the South Bridge via the port expansion bus. IRQ or DMA is generated by the South Bridge and the FIFO is read.

Figure 19:
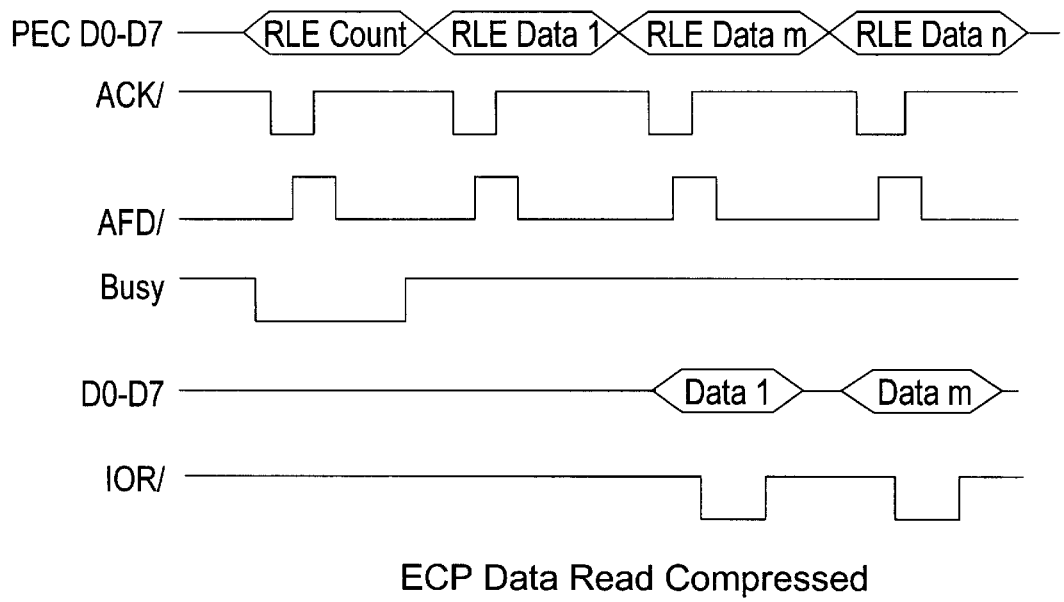
FIG. 19 shows a timing diagram of a parallel port read in ECP compressed mode.

For ECP Mode, read operation which is compressed, the RLE expansion on data received over the parallel port takes place in the South Bridge. The Busy signal from the printer indicates the location of the RLE count byte as shown in FIG. 19. An RLE tag bit is sent with the data field back to the South Bridge (via the port expansion bus), indicating whether the data field contains an RLE count or Data. FIG. 16*b* shows the RLE bit as bit 1 in field 0. The RLE bit is present in each of the six data fields received for each frame in ECP mode.

Another mode supported by the South Bridge and PEC is the Enhanced Parallel Port (EPP) mode which provides partially automated Read and Write cycles, i.e., the CPU does a read or write and the parallel port builds the parallel port timing. The CPU cycle is extended via IOCHRDY while the port cycle takes place.

IOCHRDY is a signal that can be utilized by an expansion device on the ISA bus to cause wait states to be inserted in the bus cycle until the device is ready.

Note that EPP mode operates quite differently from all other modes in that the parallel port bit time slot assignments are not aligned with frame sync. The bit time slot assignments are shown in FIG. 20*a* for an EPP write mode. Although EPP frames are not aligned to fame sync, the bit time slots are still synchronous to the bit clock. For an EPP mode write operation, an EPP frame starts with the receipt of a Start Bit. The bus (i.e., the dedicated parallel port data in and data out lines) zero-idles until a one is received, which is a start bit. The first bit received after the Start Bit indicates whether the parallel port will write or read data. The next bit indicates whether the contents of the data pins will be address or data. For write operations, the next 8 bits are the data to be transmitted. At all other times the transmit side of the bus zero idles (from the South Bridge to the port expansion circuit). Following the receipt of the Start Bit, the receive side reflects the state of the Busy pin. The transition from 1 to 0 on the Busy pin indicates the end of the write transaction.

FIG. 20*b* shows the bit assignments for an EPP Mode Read Operation. An EPP read cycle starts with the receipt of a valid Start Bit (from the South Bridge), followed by the Read-Write bit (set to 1) and the Address-Data bit. The parallel port logic within the ECP will then generate a read cycle. In the receive direction, the bus will zero-idle until the read data is received from the peripheral device connected to the bus. Upon receipt of the data, the port expansion circuit will send it to the South Bridge by first sending a start bit, followed by the 8 data bits.

Figure 21:
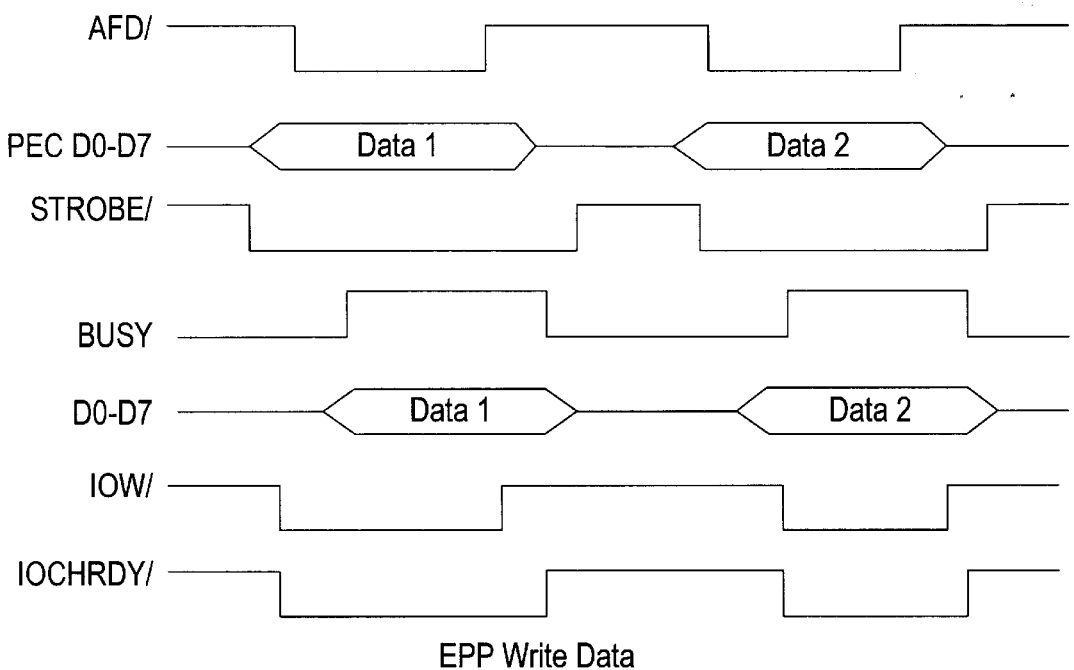
FIG. 21 shows a timing diagram of a parallel port data write operation in EPP mode.
Figure 22:
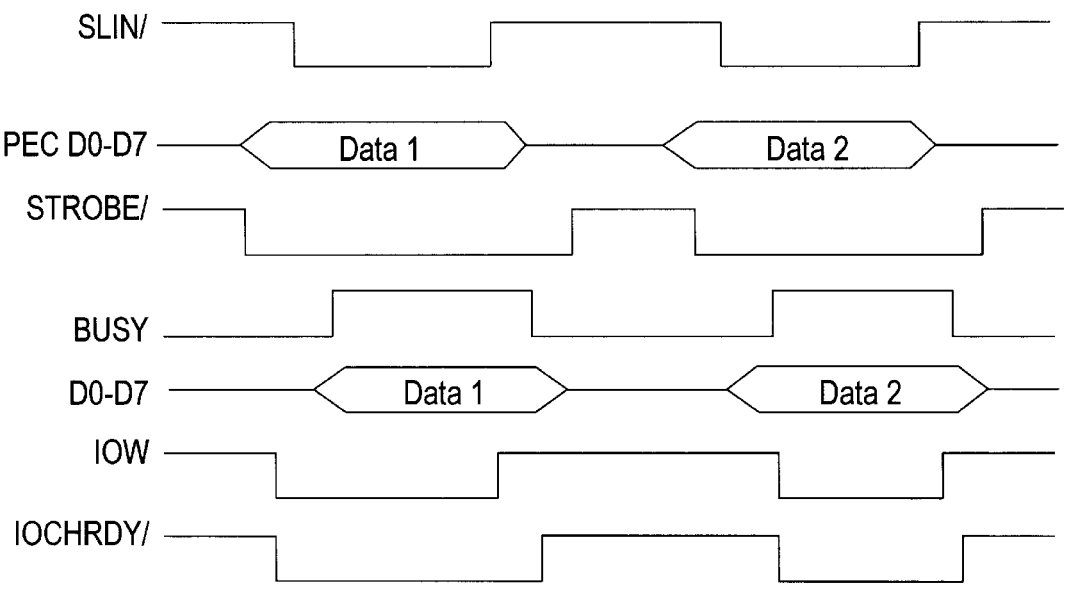
FIG. 22 shows a timing diagram of a parallel port address write operation in EPP mode.

Referring to FIGS. 21 and 22 showing the timing for EPP write operations, the AFD/ signal provides a data strobe signal indicating that data is present on the data pins (FIG. 21) while the SLCTIN/ signal provides an address strobe signal indicating that an address is present on the data pins (FIG. 22). The strobe/ signal provides a Write cycle indicator. A high value of the strobe/ signal indicates a read operation while a low value indicates a write operation. The BUSY signal provides a strobe from the printer indicating that data is valid from the printer in a read operation. Busy indicates that data has been read by the printer in a write operation.

An EPP mode write operation for an address is as follows. The CPU sets the direction (write in this case), which will drive Strobe. The CPU writes data to the address port register. The leading edge of IOW/(I/O Write Command on the ISA bus) causes a start bit to be transmitted from the South Bridge to the PEC along with the control bits and data bits. The PEC is notified via bits 1 and 2 of the transmit to PEC frame that the data is address data and that the operation is a write operation. The leading edge of IOW/ also drives IOCHRDY back to the CPU which can also be delayed until the leading edge of Busy. The SLCTIN/ pin provides the address strobe indicating that address information is contained on the pins as shown in FIG. 22. The printer asserts Busy. The assertion of busy is transmitted back to the South Bridge via the receive frame. The PEC parallel port control logic deasserts SLCTIN/ in response to the assertion of busy. IOCHRDY is deasserted in the South Bridge in response to Busy. The port expansion circuit parallel port deasserts Strobe in response to deassertion of Busy.

An EPP Write operation for data is the same as an "address" operation except the CPU writes to the Data register instead of the Address register. The SLCTIN/ pin is replaced by the AFD/ pin which provides the data strobe as shown in FIG. 21.

Figure 23:
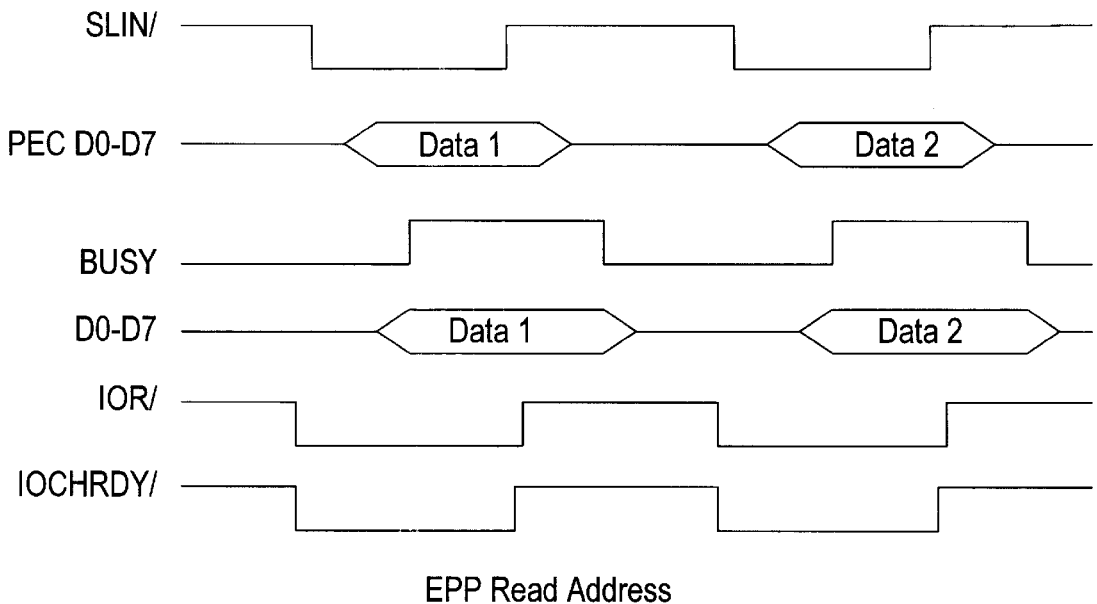
FIG. 23 shows a timing diagram of a parallel port address read operation in EPP mode.

An EPP Read operation for an Address includes the following. The CPU write sets the direction (read in this case), which drives Strobe via the port expansion bus. The CPU reads the Address register, driving IOCHRDY/. The read also causes a start bit to be sent as shown in FIG. 20b. Receipt of the start bit causes the PEC to drive SLCTIN/ as shown in FIG. 23. The peripheral responds by driving data onto the parallel port data lines and activating Busy. Busy going active causes data to be latched into the port expansion circuit and the receive frame to go from a zero idle to a start bit with the read data bits in bit positions N+1 to N+8 after the start bit. Busy going active causes SLCTIN/ to be deactivated by the PEC. The receipt of the start bit causes IOCHRDY to be deactivated by South Bridge. Deactivation of IOCHRDY allows the CPU to end the read cycle.

Figure 24:
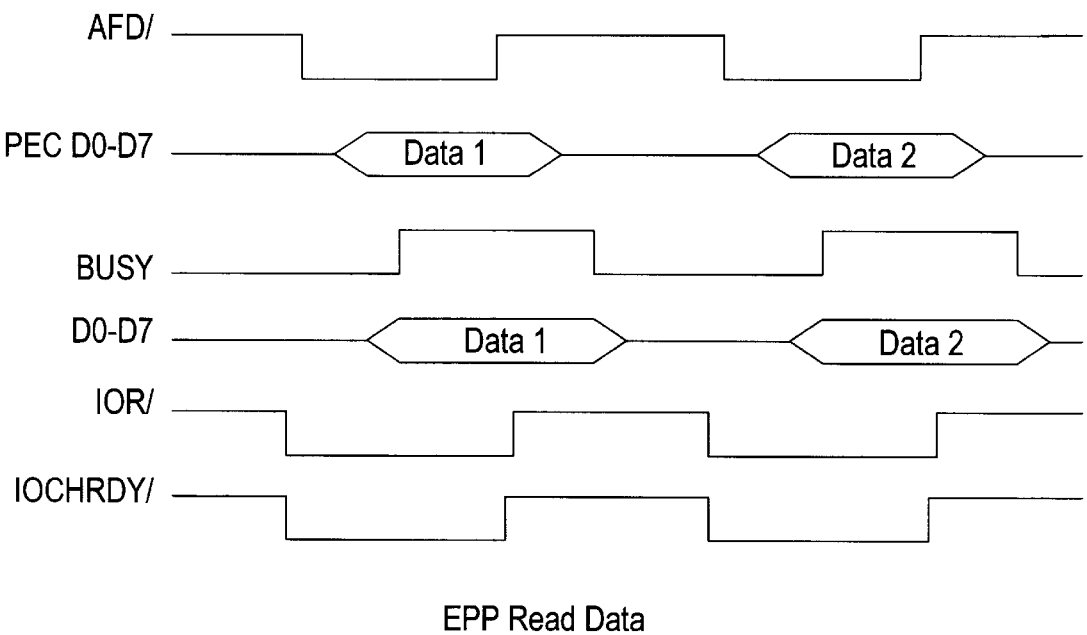
FIG. 24 shows a timing diagram of a parallel port data read operation in EPP mode.

An EPP Read operation for data is the same as for "address" except the CPU reads from the Data register instead of the Address register. The AFD/ pin which provides the data strobe is asserted instead of SLCTIN/ as shown in FIG. 24.

Note that parallel port logic 303 in the South Bridge contains a timer that generates an 10 $\mu$s error if the peripheral does not respond with a Busy signal.

The description of the invention set forth herein is illustrative, and is not intended to limit the scope of the invention as set forth in the following claims. For instance, the invention has been described with the expansion bus being the ISA bus. In other embodiments, the expansion bus may be different. For instance, as PC architecture continues to evolve, the PCI bus may become the input/output bus that is presently the ISA bus in the embodiment described above and the legacy devices may be those that interface to the PCI bus today. In such an embodiment, the South Bridge would provide an interface between PCI legacy devices and the PCI bus. Other buses may also serve as the input/output or expansion bus such as the MCA bus. Variations and modifications of the embodiments disclosed herein, may be made based on the description set forth herein, without departing from the scope and spirit of the invention as set forth in the following claims.

What is claimed is:

1. An apparatus comprising:
   a first and a second integrated circuit containing respectively a first and second portion of a parallel port, the first portion including control, configuration, data and status registers and the second portion including parallel port input and output terminals; and
   a bus coupling the first and second integrated circuits, the bus transferring parallel port control and data information between the first and second integrated circuits.

2. An apparatus as recited in claim 1 wherein the bus further comprises:
   a clock line providing a clock signal;
   a first port data out line providing first data from the first to the second integrated circuit, the first data including a plurality of first data bits, each of the first data bits being synchronous with the clock signal, the first data including data bits to be provided to the parallel port output terminals; and
   a first port data in line providing second data from the second to the first integrated circuit, the second data being comprised of a plurality of second data bits, each of the second data bits being synchronous with the clock signal, the second data including data bits indicating a state of the input terminals of the parallel port.

3. The apparatus as recited in claim 2 wherein the bus further comprises:
   a second data out line providing third data from the first to the second integrated circuit, the third data including data bits indicating a state of signals to be provided to output terminals on the second integrated circuit; and
   a second data in line providing fourth data from the second to the first integrated circuit, the fourth data including data bits indicating a state of a second group of the input terminals of the second integrated circuit.

4. The apparatus as recited in claim 3 wherein the bus further comprises:
   a frame sync line coupled to the first and second integrated circuits, assertion of the frame sync line indicating the beginning of a frame, each frame containing a predetermined data bits; and wherein
   the first port data out and first port data in line and the second data out and data in lines provide data bits in frames defined by the frame sync signal.

5. The apparatus as recited in claim 4 wherein the bus operates to provide frames substantially continuously between the first and second integrated circuits while the first and second integrated circuits are in a normal power mode.

6. The apparatus as recited in claim 1 wherein the parallel port is operating in one of a standard, PS2, Enhanced Capabilities (ECP) and Enhanced Parallel Port (EPP) mode.

7. The apparatus as recited in claim 4 wherein the first data includes an output data field including output data bits and output control bits for the parallel port and wherein the output field is repeated a plurality of times during each frame, thereby reducing latency.

8. The apparatus as recited in claim 3 wherein the second data includes an input data field containing input data bits and input control bits from the terminals of the parallel port and wherein the input data field is repeated a plurality of times during each frame, thereby reducing latency.

9. The apparatus as recited in claim 3 wherein the second integrated circuit is notified of a mode of parallel port operation according to a command received over the second data out line.

10. The apparatus as recited in claim 2 wherein the first port data in line and the first port data out line provide data bits in time slots defined by a start bit determined by parallel port input and output operations.

11. The apparatus as recited in claim 10 further comprising:
   a second data out line providing third data from the first to the second integrated circuit, the third data including data bits indicating a state of signals to be provided to output terminals on the second integrated circuit;
   a second data in line providing fourth data from the second to the first integrated circuit, the fourth data including data bits indicating a state of input terminals of the second integrated circuit;
   a frame sync line coupled to the first and second integrated circuits, assertion of the frame sync line indicating the beginning of a frame, each frame containing a predetermined number time slots; and wherein
   the second data out and data in lines provide data bits in time slots defined by the frame sync signal, the frame sync signal being independent of the parallel port input and output operations.

12. The apparatus as recited in claim 10 wherein the parallel port is operating in Enhanced Parallel Port (EPP) mode.

13. An apparatus comprising:
   a first and a second integrated circuit, containing respectively a first and second portion of a parallel port, the first portion including control, configuration, data and status registers and the second portion including parallel port input and output terminals;
   a bus connecting the first and second integrated circuits, the bus including,
      a frame sync line coupled to the first and second integrated circuit, assertion of the frame sync line indicating the beginning of a frame, each frame containing a predetermined number time slots;
      a first data out line providing first data from the first to the second integrated circuit, the first data including a predetermined number of first data bits in each frame, each of the first data bits being assigned one of the time slots, the first data including data bits representing a state of signals to be provided on output terminals of the second integrated circuit, independent of the parallel port;
      a first data in line providing second data from the second to the first integrated circuit, the second data being comprised of a predetermined number of second data bits in each frame, each of the second data bits being assigned one of the time slots, the second data including data bits indicating a state of input terminals of the second integrated circuit, independent of the parallel port;
      a clock line providing clock signals defining the time slots within the frame;
      a port data out line serially providing third data from the first to the second integrated circuit, the third data including data bits indicating a state of signals to be provided to output terminals of the parallel port on the second integrated circuit; and
      a port data in line serially providing fourth data from the second to the first integrated circuit, the fourth data including data bits indicating a state of input terminals of the parallel port.

14. The apparatus as recited in claim 13 wherein the bus operates to provide frames over the first data out line, the first data in line, the port data out line and the port data in line substantially continuously between the first and second integrated circuit while the first and second integrated circuits are in a normal power mode.

15. The apparatus as recited in claim 13 wherein the first data out line and the first data in line provide data bits in frames defined by the frame sync signal and wherein the port data in line and the port data out line provide data bits in time slots defined by a start bit independent of the frame sync signal.

16. The apparatus as recited in claim 13 wherein the port data in line and the port data out line provide data bits in time slots defined by one of the frame sync signal and a start bit independent of the frame sync signal, according to a mode of operation of the parallel port.

17. The apparatus as recited in claim 13 wherein the start bit defines the data bit time slots when the mode of operation is Enhanced Parallel Port (EPP) mode.

18. A method of dividing a parallel port between a first and second integrated circuit comprising:
   providing control, configuration and status and data registers on the first integrated circuit, the control, configuration, status and data registers having standard parallel port addresses;
   providing parallel port input and output terminals on the second integrated circuit;
   serially transferring first data from the first to the second integrated circuit over a data out line, the first data including a write data byte to be written to a peripheral device on the parallel port.

19. The method as recited in claim 18 further comprising:
   serially transferring second data from the second integrated circuit to the first integrated circuit over a data in line.

20. The method as recited in claim 19 wherein the second data includes control bits from parallel port input terminals.

21. The method as recited in claim 20 wherein the second data includes data bits from parallel port input terminals.

22. The method as recited in claim 18 further comprising transferring the first and second data in frames defined by a frame sync signal, the frame sync signal being independent from operations of the parallel port, the frames being supplied substantially continuously.

23. The method as recited in claim 18 further comprising transferring first and second data according to a start bit, the start bit being determined according to parallel port read and write operations.

24. The method as recited in claim 23 wherein for a write operation, the start bit and the write data byte is transferred over the data out line in response to a write operation to a data register in the first integrated circuit.

25. The method as recited in claim 24 further comprising:
   returning the data out line to an idle state after transferring the write data byte from the first to the second integrated circuit following the start bit;
   continuously transferring a state of a busy pin from the second to the first integrated circuit over the data in line after a start bit is received for a write operation, at least until the state of the busy pin state transitions to indicate the write data byte has been received by the peripheral device.

26. The method as recited in claim 23 further comprising, for a read operation:
   sending the start bit and a bit indicating the read operation over the data out line;
   returning the data out line to an idle state;

asserting a start bit on the data in line when a read data byte has been latched into the second integrated circuit; and transferring the read data byte to the first integrated circuit over the data in line.

27. An apparatus comprising:

a first and a second integrated circuit containing respectively a first and second portion of a parallel port, the first portion including control, configuration, data and status registers and the second portion including parallel port input and output terminals;

a bus coupling the first and second integrated circuits, the bus transferring parallel pit control and data information between the first and second integrated circuits, a clock line providing a clock signal;

a first port data out line providing first data from the first to the second integrated circuit, the first data including a plurality of first data bits, each of the first data bits being synchronous with the clock signal, the first data including data bits to be provided to the parallel port output terminals;

a first port data in line providing second data from the second to the first integrated circuit, the second data being comprised of a plurality of second data bits, each of the second data bits being synchronous with the clock signal, the second data including data bits indicating a state of the input terminals of the parallel port; and wherein the first port data out line provides data bits in time slots, the time slots being defined by the clock signal and one of a frame sync signal and a first start bit independent of the frame sync signal, according to a mode of operation of the parallel port, and wherein the frame sync signal is coupled between the first and second integrated circuits, assertion of the frame sync signal indicating the beginning of a frame, each frame containing a predetermined number of time slots, and wherein the first start bit is indicated on the first port data out line by a change from a first value to a second value on the first port data out line.

28. The apparatus as recited in claim 27, wherein the mode of operation of the parallel port is enhanced parallel port (EPP) mode.

29. The apparatus as recited in claim 27 wherein the first port data in line provides data bits in time slots defined by the clock signal and one of the frame sync signal and a second start bit independent of the frame sync signal, according to the mode of operation of the parallel port, and wherein the second start bit is indicated on the second port data out line by changing the first port data in line from the first value to the second value.

* * * * *

UNITED STATES PATENT AND TRADEMARK OFFICE
CERTIFICATE OF CORRECTION

PATENT NO.   : 6,263,385 B1
DATED        : July 17, 2001
INVENTOR(S)  : Dale E. Gulick and David Neal Suggs It is certified that error appears in the above-identified patent and that said Letters Patent is hereby corrected as shown below:

<u>Claim 27,</u>
Line 13, replace "pit" with -- port --.

Signed and Sealed this

Twenty-ninth Day of January, 2002

Attest:

Attesting Officer

JAMES E. ROGAN
*Director of the United States Patent and Trademark Office*